(12) United States Patent
Mori et al.

(10) Patent No.: US 8,384,826 B2
(45) Date of Patent: Feb. 26, 2013

(54) IMAGE DISPLAYING DEVICE AND METHOD, AND IMAGE PROCESSING DEVICE AND METHOD

(75) Inventors: Takeshi Mori, Kameyama (JP); Seiji Kohashikawa, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 726 days.

(21) Appl. No.: 12/447,181

(22) PCT Filed: Apr. 10, 2007

(86) PCT No.: PCT/JP2007/057887

§ 371 (c)(1),
(2), (4) Date: Apr. 24, 2009

(87) PCT Pub. No.: WO2008/050502

PCT Pub. Date: May 2, 2008

(65) Prior Publication Data

US 2010/0007789 A1    Jan. 14, 2010

(30) Foreign Application Priority Data

Oct. 27, 2006    (JP) .................................. 2006-291885

(51) Int. Cl.
*H04N 7/01* (2006.01)

(52) U.S. Cl. .................... 348/441; 348/607; 348/699

(58) Field of Classification Search .................. 348/441, 348/458, 699, 154, 155, 352, 607, 701, 452, 348/459, 533, 553; 375/227, 254, 346, 240.01, 375/240.16

See application file for complete search history.

(56) References Cited

U.S. PATENT DOCUMENTS 4,641,188 A * 2/1987 Dischert ....................... 348/448

(Continued)

FOREIGN PATENT DOCUMENTS

CN    1374801 A    10/2002
CN    1496114 A    5/2004

(Continued)

OTHER PUBLICATIONS

Yamauchi., "TV Standards Conversion", Journal of the Institute of Television Engineers of Japan, vol. 45, No. 12, pp. 1534-1543 (1991).

(Continued)

*Primary Examiner* — Jeffery Harold
*Assistant Examiner* — Humam Satti
(74) *Attorney, Agent, or Firm* — Birch, Stewart, Kolasch & Birch, LLP

(57) ABSTRACT

Deterioration of the image quality of a moving image which is deteriorated due to a motion-compensated frame rate conversion (FRC) processing is prevented. An image display device comprises an FRC portion (10) for converting the number of frames of an input image signal by interpolating an image signal to which the motion compensation processing is performed between frames of the input image signal and a controlling portion (15) for controlling the operation of the FRC portion (10) after determining whether or not the degree of deterioration of the input image signal is equal to or higher than a predetermined value. The FRC portion (10) comprises a motion vector detecting portion (11e) for detecting a motion vector between frames of the input image signal, an interpolating vector evaluating portion (11f) for allocating an interpolating vector between the frames based on the motion vector information, and an interpolating frame generating portion (12d) for generating an interpolating frame from the interpolating vector. If the degree of deterioration of the input image signal is equal to or higher than a predetermined value, the controlling portion (15) makes the motion compensation of the FRC portion (10) ineffective by setting the motion vector detected by the motion vector detecting portion (11e) to a zero vector.

24 Claims, 19 Drawing Sheets

U.S. PATENT DOCUMENTS

| | | | |
|---|---|---|---|
| 4,984,074 A * | 1/1991 | Uomori et al. | 348/699 |
| 5,057,921 A | 10/1991 | Robert et al. | |
| 5,111,511 A | 5/1992 | Ishii et al. | |
| 5,748,231 A * | 5/1998 | Park et al. | 348/207.99 |
| 5,995,154 A | 11/1999 | Heimburger | |
| 7,199,771 B2 * | 4/2007 | Yamazaki et al. | 345/84 |
| 7,295,616 B2 * | 11/2007 | Sun et al. | 375/240.27 |
| 7,343,044 B2 * | 3/2008 | Baba et al. | 382/236 |
| 7,423,691 B2 * | 9/2008 | Orlick et al. | 348/448 |
| 7,696,988 B2 * | 4/2010 | Wu et al. | 345/204 |
| 7,705,918 B2 * | 4/2010 | Yamauchi | 348/607 |
| 8,059,203 B2 * | 11/2011 | Sasai et al. | 348/622 |
| 2002/0075959 A1 | 6/2002 | Dantwala | |
| 2004/0085480 A1 | 5/2004 | Salzer et al. | |
| 2004/0189867 A1 | 9/2004 | Pelagotti et al. | |
| 2005/0134735 A1 | 6/2005 | Swartz | |
| 2005/0249278 A1 * | 11/2005 | Sasai et al. | 375/240.03 |
| 2006/0023800 A1 * | 2/2006 | Okada | 375/260 |
| 2007/0052647 A1 * | 3/2007 | Chen | 345/92 |

FOREIGN PATENT DOCUMENTS

| | | | |
|---|---|---|---|
| CN | 1652569 A | 8/2005 | |
| EP | 0 781 041 A1 | 6/1997 | |
| EP | 1 404 130 A1 | 3/2004 | |
| JP | 2-5689 A | 1/1990 | |
| JP | 2004-120757 A | 4/2004 | |
| JP | 2004-516724 A | 6/2004 | |
| JP | 2004-521563 A | 7/2004 | |
| JP | 2005-208613 A | 8/2005 | |
| WO | WO-02/49365 A2 | 6/2002 | |
| WO | WO-02/102058 A1 | 12/2002 | |

OTHER PUBLICATIONS

Hidekazu et al., "Consideration on Motion Picture Quality of the Hold Type Display with an octuple-rate CRT", IEICE Technical Report, Institute of Electronics, Information and Communication Engineers, EID96-4 (Jun. 1996), pp. 19-26.

Olukayode Ojo et al., "Adaptive Global Concealment of Video Up-Conversion Artefacts," IEEE Transactions on Consumer Electronics, vol. 47, No. 1, Feb. 1, 2001, pp. 40-46, XP002669070.

Supplementary Partial European Search Report for corresponding EP Application No. 07 74 1323, dated Mar. 7, 2012.

* cited by examiner

IMAGE DISPLAYING DEVICE AND METHOD, AND IMAGE PROCESSING DEVICE AND METHOD

TECHNICAL FIELD

The present invention relates to an image displaying device and method and an image processing device and method, having a function of converting a frame rate or a field rate, and more particularly, to an image displaying device and an image displaying method performed by the device, and an image processing device and an image processing method performed by the device, that prevent deterioration of the image quality of a moving image caused by a motion-compensated rate conversion processing.

BACKGROUND OF THE INVENTION

As compared to conventional cathode-ray tubes (CRTs) primarily used for realizing moving images, LCDs (Liquid Crystal Displays) have a drawback, so-called motion blur, which is the blurring of outline of a moving portion perceived by a viewer when displaying a moving image. It is pointed out that this motion blur arises from the LCD display mode itself (see, e.g., Specification of Japanese Patent No. 3295437; "Ishiguro Hidekazu and Kurita Taiichiro, "Consideration on Motion Picture Quality of the Hold Type Display with an octuple-rate CRT", IEICE Technical Report, Institute of Electronics, Information and Communication Engineers, EID96-4 (1996-06), p. 19-26").

Since fluorescent material is scanned by an electron beam to cause emission of light for display in CRTs, the light emission of pixels is basically impulse-like although slight afterglow of the fluorescent material exists. This is called an impulse display mode. On the other hand, in the case of LCDs, an electric charge is accumulated by applying an electric field to liquid crystal and is retained at a relatively high rate until the next time the electric field is applied. Especially, in the case of the TFT mode, since a TFT switch is provided for each dot composing a pixel and each pixel normally has an auxiliary capacity, the ability to retain the accumulated charge is extremely high. Therefore, the light emission is continued until the pixels are rewritten by the application of the electric field based on the image information of the next frame or field (hereinafter, represented by the frame). This is called a hold display mode.

Since the impulse response of the image displaying light has a temporal spread in the above hold display mode, spatial frequency characteristics deteriorate along with temporal frequency characteristics, resulting in the motion blur. Since the human eye can smoothly follow a moving object, if the light emission time is long as in the case of the hold type, the movement of image seems jerky and unnatural due to the time integration effect.

To improve the motion blur in the above hold display mode, a frame rate (number of frames) is converted by interpolating an image between frames in a known technology. This technology is called FRC (Frame Rate Converter) and is put to practical use in liquid crystal displaying devices, etc.

Conventionally known methods of converting the frame rate include various techniques such as simply repeating readout of the same frame for a plurality of times and frame interpolation using linear interpolation between frames (see, e.g., Yamauchi Tatsuro, "TV Standards Conversion", Journal of the Institute of Television Engineers of Japan, Vol. 45, No. 12, pp. 1534-1543 (1991)). However, in the case of the frame interpolation processing using the linear interpolation, unnaturalness of motion (jerkiness, judder) is generated due to the frame rate conversion, and the motion blur disturbance due to the above hold display mode cannot sufficiently be improved, resulting in inadequate image quality.

To eliminate effects of the jerkiness, etc., and improve quality of moving images, a motion-compensated frame interpolation processing using motion vectors is proposed. Since a moving image itself is captured to compensate the image movement in this processing, highly natural moving images may be acquired without deteriorating the resolution and generating the jerkiness. Since interpolation image signals are generated with motion compensation, the motion blur disturbance due to the above hold display mode may sufficiently be improved.

Above Specification of Japanese Patent No. 3295437 discloses a technology of motion-adaptively generating interpolating frames to increase a frame frequency of a display image for improving deterioration of spatial frequency characteristics causing the motion blur. In this case, at least one interpolation image signal interpolated between frames of a display image is motion-adaptively created from the previous and subsequent frames, and the created interpolation image signals are interpolated between the frames and are sequentially displayed.

FIG. 1 is a block diagram of a schematic configuration of an FRC drive display circuit in a conventional liquid crystal displaying device and, in FIG. 1, the FRC drive display circuit includes an FRC portion 100 that converts the number of frames of the input image signal by interpolating the image signals to which the motion compensation processing has been given between frames of the input video signal, an active-matrix liquid crystal display panel 104 having a liquid crystal layer and an electrode for applying the scan signal and the data signal to the liquid crystal layer, and an electrode driving portion 103 for driving a scan electrode and a data electrode of the liquid crystal display panel 104 based on the image signal subjected to the frame rate conversion by the FRC portion 100.

The FRC portion 100 includes a motion vector detecting portion 101 that detects motion vector information from the input image signal and an interpolating frame generating portion 102 that generates interpolating frames based on the motion vector information acquired by the motion vector detecting portion 101.

In the above configuration, for example, the motion vector detecting portion 101 may obtain the motion vector information with the use of a block matching method and a gradient method described later or if the motion vector information is included in the input image signal in some form, this information may be utilized. For example, the image data compression-encoded with the use of the MPEG format includes motion vector information of a moving image calculated at the time of encoding, and this motion vector information may be acquired.

FIG. 2 is a diagram for explaining a frame rate conversion processing by the conventional FRC drive display circuit shown in FIG. 1. The FRC portion 100 generates interpolating frames (gray-colored images in FIG. 2) between frames with the motion compensation using the motion vector information output from the motion vector detecting portion 101 and sequentially outputs the generated interpolation signals along with the input frame signals to perform processing of converting the frame rate of the input image signal from 60 frames per second (60 Hz) to 120 frames per second (120 Hz).

FIG. 3 is a diagram for explaining an interpolating frame generation processing of the motion vector detecting portion 101 and the interpolating frame generating portion 102. The motion vector detecting portion 101 uses the gradient method to detect a motion vector 105 from, for example, a frame #1 and a frame #2 shown in FIG. 3. The motion vector detecting portion 101 obtains the motion vector 105 by measuring a direction and an amount of movement in 1/60 second between the frame #1 and the frame #2. The interpolating frame generating portion 102 then uses the obtained motion vector 105 to allocate an interpolating vector 106 between the frame #1 and the frame #2. An interpolating frame 107 is generated by moving an object (in this case, an automobile) from a position of the frame #1 to a position after 1/120 second based on the interpolating vector 106.

By performing the motion-compensated frame interpolation processing with the use of the motion vector information to increase a display frame frequency in this way, the display state of the LCD (the hold display mode) can be made closer to the display state of the CRT (the impulse display mode) and the image quality deterioration can be improved which is due to the motion blur generated when displaying a moving image.

In the motion-compensated frame interpolation processing, it is essential to detect the motion vectors for performing the motion compensation. For example, the block matching method and the gradient method are proposed as representative techniques for the motion vector detection. In these methods, the motion vector is detected for each pixel or small block between two consecutive frames and this motion vector is used to interpolate each pixel or small block of the interpolating frame between two frames. An image at an arbitrary position between two frames is interpolated at an accurately compensated position to convert the number of frames.

DISCLOSURE OF THE INVENTION

Problems to be Solved by the Invention

For detecting a motion vector that is indispensable for a motion compensated frame interpolation processing, one of the conditions for the detection is that the brightness level of a moving object does not vary even when the moving object moves. Therefore, errors occur in the detection of the motion vector when an input image signal is deteriorated due to unsteadiness or view-display noise in an image, occurrence of a noise, etc. And this causes a problem that an interpolation image is deteriorated.

For example, in the case where the S/N ratio (signal-noise ratio) is lowered due to the increase of the amount of noise component included in the input image signal, when a motion-compensated frame rate conversion (FRC) processing is applied to the above image signal, a problem arises that errors occur in the detection of the motion vector and these errors cause deterioration of the image quality of a displayed image.

The types of noises that cause the deterioration of the video image are block noise, burst noise, etc., that occur when receiving environment and/or wave conditions is/are poor or when many data errors are present; etc., in addition to an external noise. Detection errors of the motion vector and errors of the motion compensation tend to occur in an image signal deteriorated due to these types of noises.

The present invention was conceived in view of the above circumstances and the object thereof is to provide an image displaying device and method, and an image processing device and method capable of preventing the image quality deterioration of a moving image due to the motion-compensated frame rate conversion (FRC) processing.

Means for Solving the Problems

A first invention of the present application is an image displaying device having a rate converting portion that interpolates an interpolation image signal between frames or fields of an input image signal to convert the number of frames or fields of the input image signal, wherein a determining portion that determines the degree of deterioration of the input image signal is included, and the rate converting portion comprises an interpolation image generating portion that generates the interpolation image signal by giving a motion compensation processing to the input image signal based on the motion vector information between frames or fields of the input image signal, and when the degree of the deterioration of the input image signal determined by the determining portion is equal to or higher than a predetermined value, the interpolation of the image signal generated by giving the motion compensation processing is not executed.

A second invention of the present application is the image displaying device, wherein when the degree of the deterioration of the input image signal determined by the determining portion is equal to or higher than a predetermined value, the rate converting portion interpolates the image signal generated by making the motion compensation processing in the interpolation image generating portion ineffective between the frames or fields of the input image signal.

A third invention of the present application is the image displaying device, wherein the interpolation image generating portion comprises a motion vector detecting portion that detects the motion vector information between consecutive frames or fields included in the input image signal, and an interpolating vector allocating portion that allocates an interpolating vector between the frames or the fields based on the detected motion vector information.

A fourth invention of the present application is the image displaying device, wherein when the degree of the deterioration of the input image signal determined by the determining portion is equal to or higher than a predetermined value, the interpolation image generating portion makes the motion compensation processing ineffective by setting the motion vector detected by the motion vector detecting portion to zero-vector.

A fifth invention of the present application is the image displaying device, wherein when the degree of the deterioration of the input image signal determined by the determining portion is equal to or higher than a predetermined value, the interpolation image generating portion makes the motion compensation processing ineffective by setting the interpolating vector allocated by the interpolating vector allocating portion to zero-vector.

A sixth invention of the present application is the image displaying device, wherein when the degree of the deterioration of the input image signal determined by the determining portion is equal to or higher than a predetermined value, the interpolation image signal generated by giving the motion compensation processing is not inserted between the frames or the fields of the input image signal and the number of frames or fields of the input image signal is not converted.

A seventh invention of the present application is the image displaying device, wherein a driving frequency of a display panel that displays an image signal is variable, and a portion for changing the driving frequency of the display panel from a frame frequency or a field frequency converted by the rate converting portion to a frame frequency or a field frequency of the input image signal when the degree of the deterioration of the input image signal determined by the determining portion is equal to or higher than a predetermined value is included.

An eighth invention of the present application is the image displaying device, wherein when the degree of the deterioration of the input image signal determined by the determining portion is equal to or higher than a predetermined value, the rate converting portion converts the number of frames or fields of the input image signal by inserting an image signal to which the motion compensation processing has not been performed between frames or fields of the input image signal.

A ninth invention of the present application is the image displaying device, wherein when the degree of the deterioration of the input image signal determined by the determining portion is equal to or higher than a predetermined value, the rate converting portion converts the number of frames or fields of the input image signal by inserting an image signal to which the motion compensation processing has not been performed between frames or fields of the input image signal.

A tenth invention of the present application is the image displaying device, wherein when the degree of the deterioration of the input image signal determined by the determining portion is equal to or higher than a predetermined value, the rate converting portion converts the number of frames or fields of the input image signal by interpolating an image signal obtained by giving a linear interpolation processing to an image signal of the frame or the field between frames or fields of the input image signal.

An eleventh of the present application is the image displaying device, wherein when the degree of the deterioration of the input image signal determined by the determining portion is equal to or higher than a predetermined value, the rate converting portion converts the number of frames or fields of the input image signal by inserting an predetermined monochrome image signal between frames or fields of the input image signal.

A twelfth invention of the present application is the image displaying device, wherein the determining portion determines the degree of deterioration of the input image signal based on the S/N ratio of the input image signal.

A thirteenth invention of the present application is the image displaying device, wherein the determining portion determines the degree of deterioration of the input image signal based on the C/N ratio of the input image signal.

A fourteenth invention of the present application is the image displaying device, wherein the determining portion determines the degree of deterioration of the input image signal based on the number of detected errors of the input image signal.

A fifteenth invention of the present application is the image displaying device, wherein the determining portion determines the degree of deterioration of the input image signal based on the received electric field intensity of the input image signal.

A sixteenth invention of the present application is an image displaying method having a rate converting process that converts the number of frames or fields of an input image signal by interpolating an interpolation image signal between frames or fields of the input image signal, wherein a process for determining the degree of deterioration of the input image signal is included, and the rate converting process comprises an interpolation image generating process for generating an interpolation image signal by giving motion compensation processing to the input image signal based on the motion vector information between frames or fields of the input image signal, and when the determined degree of the deterioration of the input image signal is equal to or higher than the predetermined value, the interpolation of the image signal generated by giving the motion compensation processing is not executed.

A seventeenth invention of the present application is the image displaying method, wherein when the degree of the deterioration of the input image signal is equal to or higher than the predetermined value, the image signal generated by making the motion compensation processing in the interpolation image generating process ineffective is interpolated between frames or fields of the input image signal.

An eighteenth invention of the present application is the image displaying method, wherein when the degree of the deterioration of the input image signal is equal to or higher than the predetermined value, the interpolation image signal generated by giving the motion compensation processing is not inserted between frames or fields of the input image signal and the number of frames or fields of the input image signal is not converted.

A nineteenth invention of the present application is the image displaying method, wherein when the degree of the deterioration of the input image signal is equal to or higher than the predetermined value, the number of frames or fields of the input image signal is converted by inserting an image signal of the frame or the field between frames or fields of the input image signal in the rate converting process.

A twentieth invention of the present application is the image displaying method, wherein when the degree of the deterioration of the input image signal is equal to or higher than the predetermined value, the number of frames fields of the input image signal is converted by interpolating an image signal to which a liner interpolation processing has been performed to an image signal of the frame or the field between frames or fields of the input image signal in the rate converting process.

A twenty-first invention of the present application is the image displaying method, wherein when the degree of the deterioration of the input image signal is equal to or higher than the predetermined value, the number of frames or fields of the input image signal is converted by inserting a predetermined monochrome image signal between frames or fields of the input image signal in the rate converting process.

A twenty-second invention of the present application is an image processing method having a rate converting portion that interpolates an interpolation image signal between frames or fields of an input image signal to convert the number of frames or fields of the input image signal, wherein the rate converting portion comprises an interpolation image generating portion that generates the interpolation image signal by giving a motion compensation processing to the input image signal based on the motion vector information between frames or fields of the input image signal, and when the degree of deterioration of the input image signal determined by the determining portion of determining the degree of the deterioration of the input image signal is equal to or higher than a predetermined value, the interpolation of the image signal generated by giving the motion compensation processing is not executed.

A twenty-third invention of the present application is the image processing method, wherein when the degree of the deterioration of the input image signal determined by the determining portion is equal to or higher than a predetermined value, the rate converting portion interpolates the image signal generated by making the motion compensation processing in the interpolation image generating portion between frames or fields of the input image signal.

A twenty-fourth invention of the present application is the image processing device, wherein when a genre determined by the determining portion is the predetermined genre, the rate converting portion converts the number of frames or fields of the input image signal by inserting an image signal to which the motion compensation processing has not been performed between frames or fields of the input image signal.

A twenty-fifth invention of the present application is an image processing method having a rate converting process that converts the number of frames or fields of an input image signal by interpolating an interpolation image signal between frames or fields of the input image signal, wherein a process for determining the degree of deterioration of the input image signal is included, the rate converting process comprises an interpolation image generating process for generating an interpolation image signal by giving the motion compensation processing to the input image signal based on the motion vector information between frames or fields of the input image signal, and when the determined degree of the deterioration of the input image signal is equal to or higher than the predetermined value, the interpolation of the image signal generated by giving the motion compensation processing is not executed.

A twenty-sixth invention of the present application is the image processing method, wherein when the degree of the deterioration of the input image signal is equal to or higher than the predetermined value, an image signal generated by making the motion compensation processing in the interpolation image generating process is interpolated between frames or fields of the input image signal in the rate converting process.

A twenty-seventh invention of the present application is the image processing method, wherein when the degree of the deterioration of the input image signal is equal to or higher than the predetermined value, the number of frames or fields of the input image signal is converted by inserting an image signal of the frame or the field between frames or fields of the input image signal in the rate converting process.

A twenty-eighth invention of the present application is the image processing method, wherein when the degree of the deterioration of the input image signal is equal to or higher than the predetermined value, the number of frames or fields of the input image signal is converted by interpolating an image signal generated by giving a linear interpolation processing to the image signal of the frame or the field between frames or fields of the input image signal in the rate converting process.

A twenty-ninth invention of the present application is the image processing method, wherein when the degree of the deterioration of the input image signal is equal to or higher than the predetermined value, the number of frames or fields of the input image signal is converted by inserting a predetermined monochrome image signal between frames or fields of the input image signal in the rate converting process.

A thirtieth invention of the present application is an image displaying device having a rate converting portion that interpolates an interpolation image signal between frames or fields of an input image signal to convert the number of frames or fields of the input image signal, wherein a determining portion for determining the degree of deterioration of the input image signal is included, the rate converting portion comprises an interpolation image generating portion that generates the interpolation image signal by giving motion compensation processing to the input image signal based on the motion vector information between frames or fields of the input image signal, and when the degree of the deterioration of the input image signal determined by the determining portion is equal to or higher than a predetermined value, an interpolation image signal generated by reducing the compensation intensity of the motion compensation processing is interpolated between frames or fields of the input image signal.

A thirty-first invention of the present application is the image displaying device, wherein the interpolation image generating portion generates the interpolation image signal by making weighted addition of an image signal to which the motion compensation processing has been performed and an image signal to which the motion compensation processing has not been performed at a predetermined ratio, and when the degree of the deterioration of the input image signal determined by the determining portion is equal to or higher than the predetermined value, the ratio of the weighted addition is varied.

A thirty-second invention of the present application is the image displaying device, wherein when a genre determined by the determining portion is the predetermined genre, the interpolation image generating portion defines an image signal to which the motion compensation processing has not been performed as the interpolation image signal, and when the degree of the deterioration of the input image signal determined by the determining portion is equal to or higher than the predetermined value, the interpolation image generating portion defines an image signal to which the motion compensation processing has been performed as the interpolation image signal.

A thirty-third invention of the present application is the image displaying device, wherein the interpolation image generating portion uses an image signal to which a linear interpolation processing has been performed between frames or fields of the input image signal as the image signal to which the motion compensation processing has not been performed.

A thirty-fourth invention of the present application is the image displaying device, wherein the determining portion determines the degree of the deterioration of the input image signal based on the S/N ratio of the input image signal.

A thirty-fifth invention of the present application is the image displaying device, wherein the determining portion determines the degree of the deterioration of the input image signal based on the C/N ratio of the input image signal.

A thirty-sixth invention of the present application is the image displaying device, wherein the determining portion determines the degree of the deterioration of the input image signal based on the number of detected errors of the input image signal.

A thirty-seventh invention of the present application is the image displaying device, wherein the determining portion determines the degree of the deterioration of the input image signal based on the received electric field intensity of the input image signal.

A thirty-eighth invention of the present application is an image displaying method having a rate converting process that interpolates an interpolation image signal between frames or fields of an input image signal to convert the number of frames or fields of the input image signal, wherein a process for determining the degree of deterioration of the input image signal is included, the rate converting process comprises an interpolation image generating process for generating an interpolation image signal by giving motion compensation processing to the input image signal based on the motion vector information between frames or fields of the input image signal, and when the determined degree of the deterioration of the input image signal is equal to or higher than the predetermined value, an interpolation image signal generated by reducing the compensation intensity of the motion compensation processing is interpolated between frames or fields of the input image signal.

A thirty-ninth invention of the present application is an image processing device having a rate converting portion that interpolates an interpolation image signal between frames or fields of an input image signal to convert the number of frames or fields of the input image signal, wherein the rate converting portion comprises an interpolation image generating portion that generates an interpolation image signal by giving motion compensation processing to the input image signal based on the motion vector information between frames or fields of the input image signal, and when the degree of the deterioration of the input image signal determined by a determining portion of determining the degree of deterioration of the input image signal is equal to or higher than the predetermined value, an interpolation image signal generated by reducing the compensation intensity of the motion compensation processing is interpolated between frames or fields of the input image signal.

A fortieth invention of the present application is an image processing method having a rate converting process that interpolates an interpolation image signal between frames or fields of an input image signal to convert the number of frames or fields of the input image signal, wherein a process for determining the degree of deterioration of the input image signal is included, the rate converting process comprises an interpolation image generating process for generating an interpolation image signal by giving motion compensation processing to the input image signal based on the motion vector information between frames or fields of the input image signal, and when it is determined that the degree of the deterioration of the input image signal is equal to or higher than the predetermined value, an interpolation image signal generated by reducing the compensation intensity of the motion compensation processing is interpolated between frames or fields of the input image signal.

Effects of the Invention

According to the present invention, the image quality deterioration of displayed images may effectively be prevented by not executing the interpolation processing through motion compensation when an image signal deteriorated due to unsteadiness or view-display noise in an image, occurrence of noise component, etc., is input.

Figure 1:
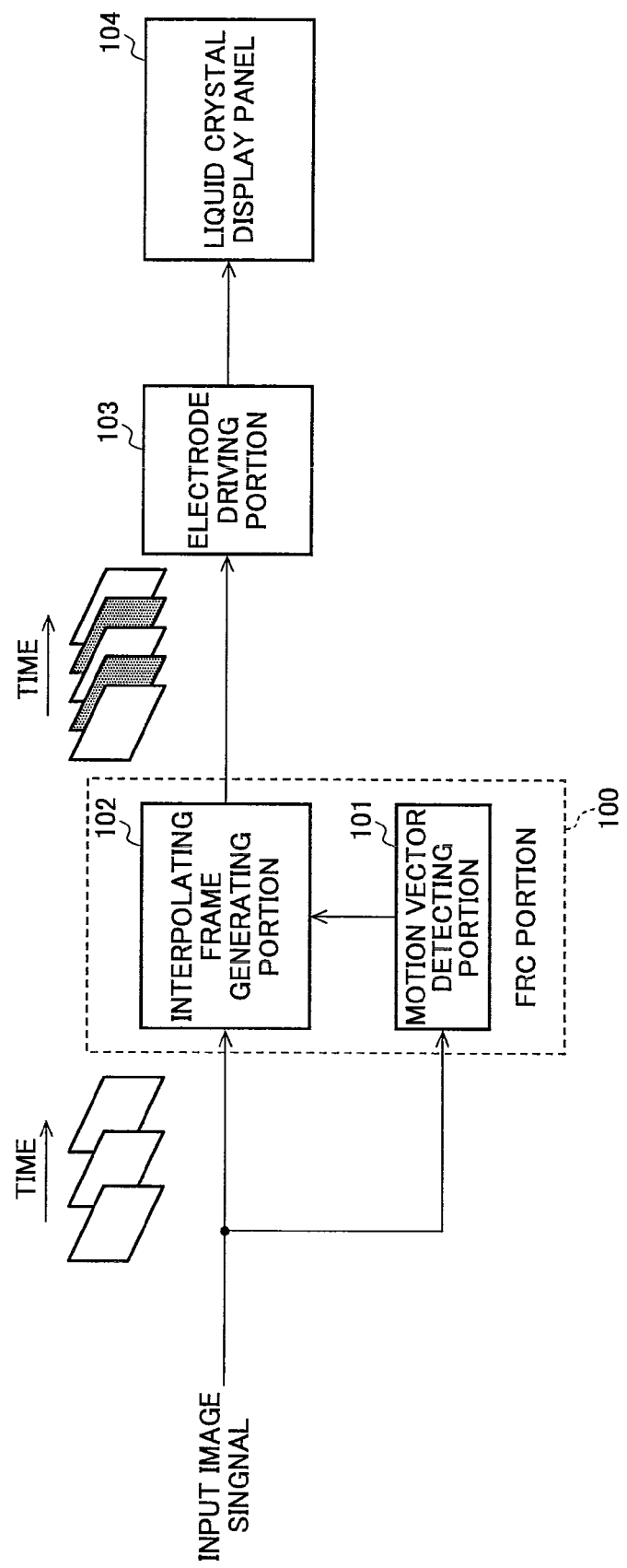
FIG. 1 is a block diagram of a schematic configuration of an FRC drive display circuit in a conventional liquid crystal displaying device.
Figure 2:
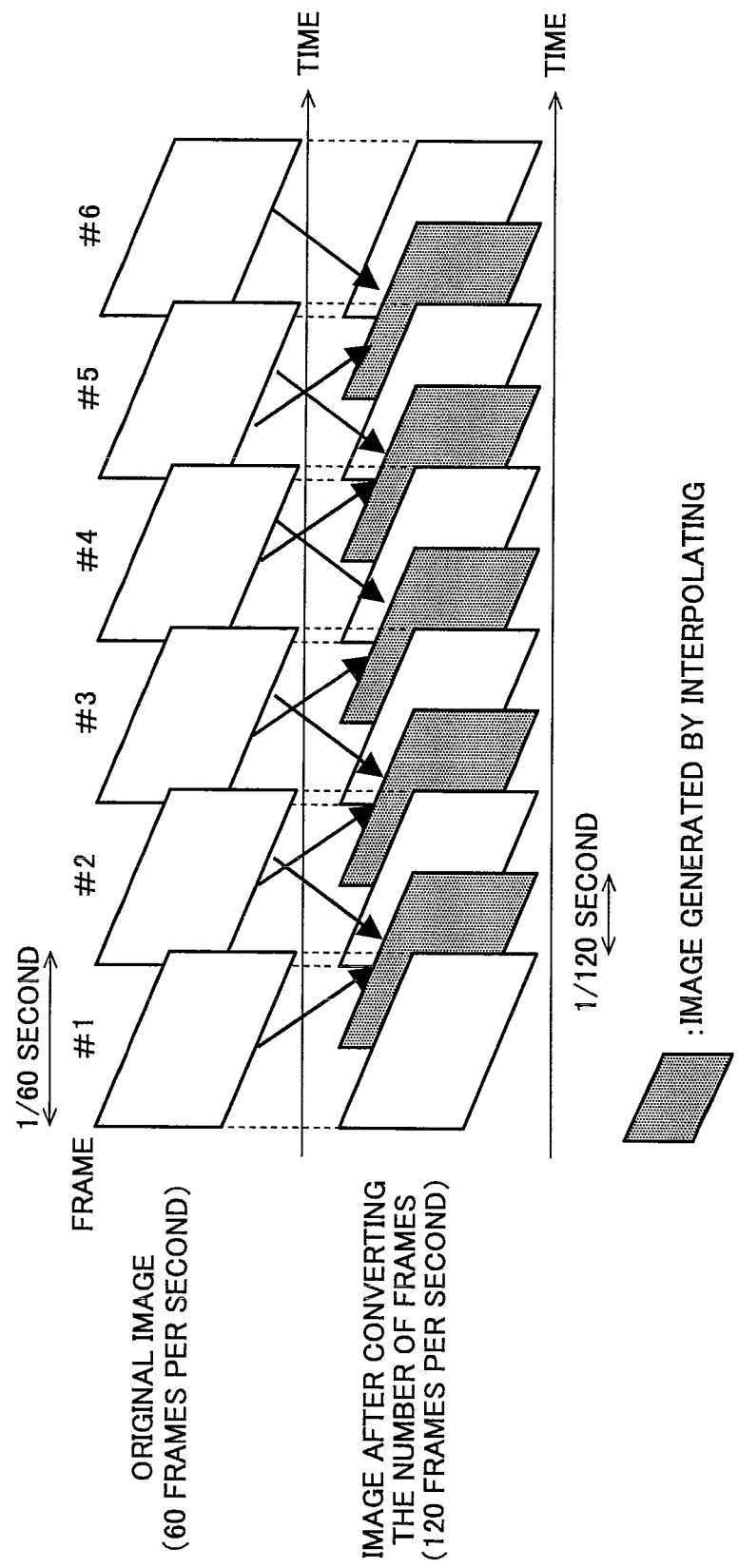
FIG. 2 is a diagram for explaining a frame rate conversion processing by the conventional FRC drive display circuit shown in FIG. 1.
Figure 3:
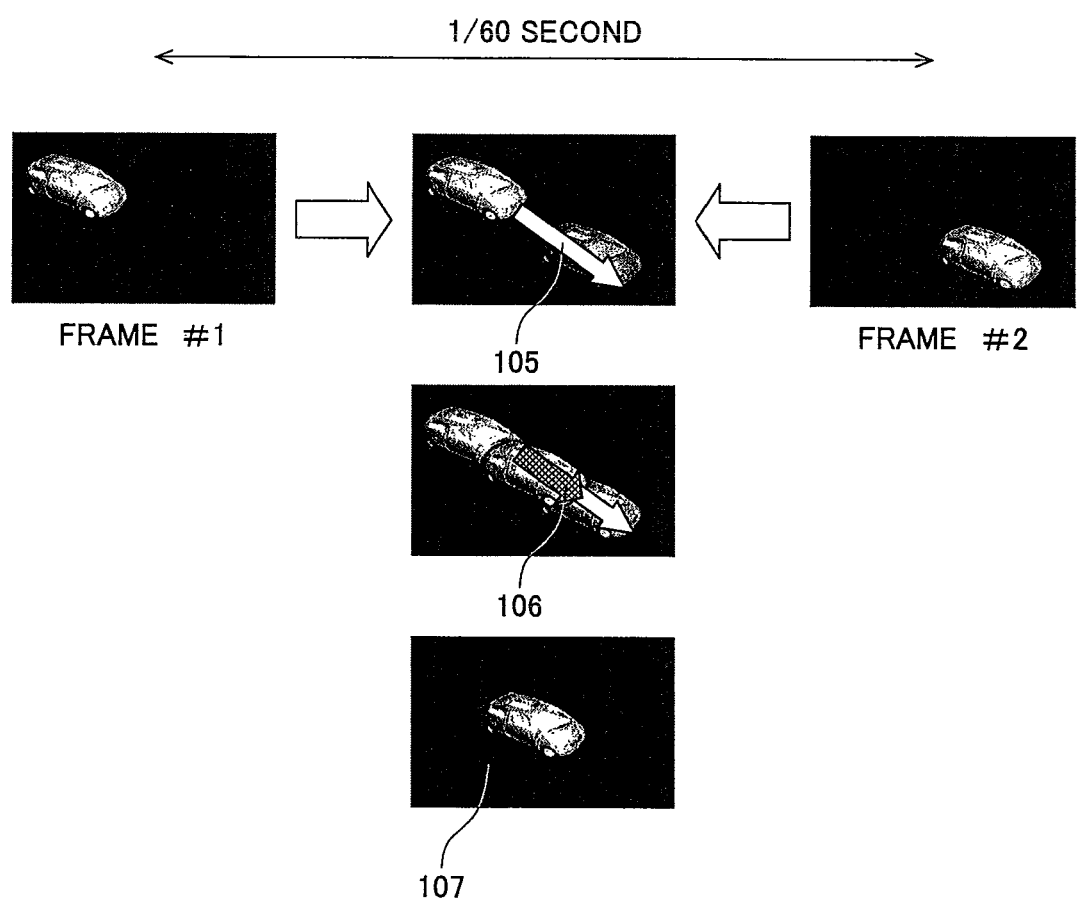
FIG. 3 is a diagram for explaining an interpolating frame generation processing of a motion vector detecting portion and an interpolating frame generating portion.

EXPLANATIONS OF REFERENCE NUMERALS 10, 100 . . . frame rate converting (FRC) portion; 11 . . . vector detecting portion; 11a . . . luminance signal extracting portion; 11b . . . preprocessing filter; 11c . . . motion detection frame memory; 11d . . . initial vector memory; 11e, 101 . . . motion vector detecting portion; 11f . . . interpolating vector evaluating portion; 12 . . . frame generating portion; 12a . . . interpolating frame memory; 12b, 102 . . . interpolating frame generating portion; 12c . . . time base conversion frame memory; 12d . . . time base converting portion; 12e . . . compensation intensity varying portion; 13 . . . demodulating portion, 14 . . . decoder, 15 . . . controlling portion; 16 . . . switching portion; 17 . . . zero vector; 18, 103 . . . electrode driving portion; 19, 104 . . . liquid crystal display panel; 20 . . . path; 21 . . . memory; 22 . . . linear interpolation processing portion; 23 . . . black-level signal insertion processing portion; 105 . . . motion vector; 106 . . . interpolating vector; and 107 . . . interpolating frame.

PREFERRED EMBODIMENTS OF THE INVENTION

A preferred embodiment of an image displaying device of the present invention will now be described referring to the accompanying drawings. Although the present invention is applicable to either field signals and interpolation field signals or frame signals and interpolating frame signals, the frame signals and the interpolating frame signals will be described as a representative example since both (field and frame) are in a similar relationship with each other.

Figure 4:
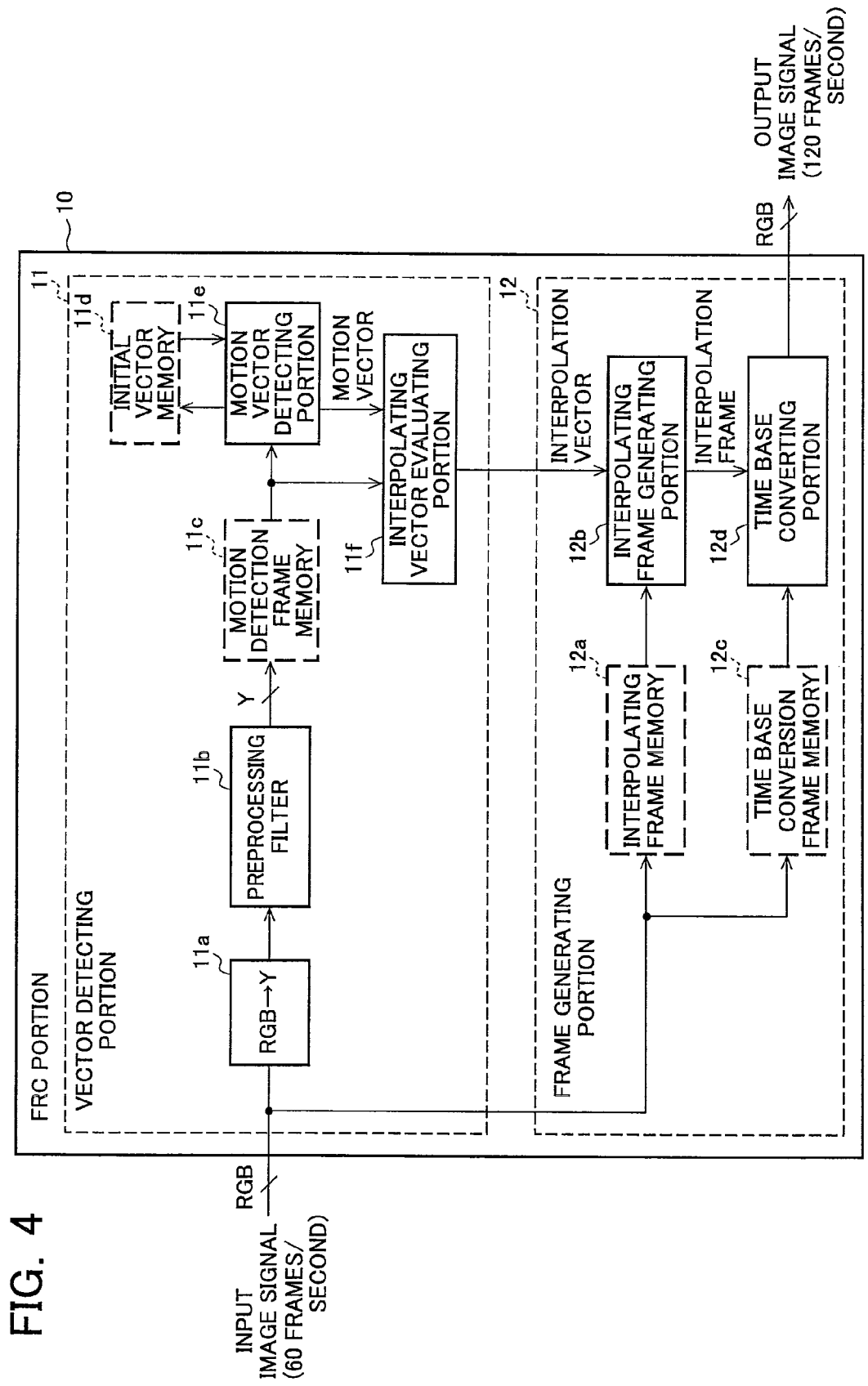
FIG. 4 is a block diagram of an exemplary configuration of a frame rate converting portion included in an image displaying device of the present invention.

FIG. 4 is a block diagram of an exemplary configuration of a motion compensated frame rate converting portion included in the image displaying device of the present invention, in FIG. 5, reference numeral 10 denotes a frame rate converting portion (hereinafter, FRC portion), and the FRC portion 10 corresponds to a rate converting portion of the present invention and is comprised of a vector detecting portion 11 that detects a motion vector between two consecutive frames included in an input image signal and a frame generating portion 12 that generates an interpolating frame (interpolation image) based on the detected motion vector. Although the iterative gradient method is used for the motion vector detection in the description of the vector detecting portion 11, the method is not limited to the iterative gradient method and may be the block matching method.

A feature of the iterative gradient method is that several types of movement amounts may be detected, and a motion vector may be detected even from a moving object having a small region since a motion vector may be detected for each block. The circuit configuration thereof may be realized in a smaller scale than other modes (such as the block matching method). In the iterative gradient method, an already detected motion vector of a neighboring block is defined as an initial deflection vector, which is used as a starting point to repeat calculations of the gradient method for a detected block. With this method, a substantially accurate movement amount may be acquired by repeating the gradient method about two times.

In FIG. 4, the vector detecting portion 11 includes a luminance signal extracting portion 11a that extracts a luminance signal (Y signal) from an input image signal (RGB signal), a preprocessing filter 11b that limits a high bandwidth by applying LPF to the extracted Y signal, a motion detection frame memory 11c, an initial vector memory 11d that accumulates initial vector candidates, a motion vector detecting portion 11e that detects motion vectors between frames with the use of the iterative gradient method, and an interpolating vector evaluating portion 11f that allocates an interpolating vector between the frames based on the detected motion vectors.

The FRC portion 10 corresponds to the rate converting portion of the present invention; the motion vector detecting portion 11e corresponds to a motion vector detecting portion of the present invention; and the interpolating vector evaluating portion 11f corresponds to an interpolating vector allocating portion of the present invention.

Since a differential component of a pixel is used for the calculations of the above iterative gradient method, the method is easily affected by noises and calculation errors are increased if large gradient variations exist in a detected block and, therefore, the LPF is applied by the preprocessing filter 11b to limit the high bandwidth. In the initial vector memory 11d, motion vectors (initial vector candidates) already detected in a frame immediately before the previous frame are accumulated as initial vector candidates.

The motion vector detecting portion 11e selects a motion vector closest to the motion vector of the detected block for an initial vector from the initial vector candidates accumulated in the initial vector memory 11d. The initial vector is selected by the block matching method from the already detected motion vectors (initial vector candidates) in neighboring blocks of the detected block. The motion vector detecting portion 11e uses the selected initial vector as a starting point to detect a motion vector between a previous frame and a current frame through the calculations of the gradient method.

The interpolating vector evaluating portion 11f evaluates the motion vectors detected by the motion vector detecting portion 11e, allocates an optimum interpolating vector to an interpolation block between frames based on the evaluation result, and outputs the vector to the frame generating portion 12.

The frame generating portion 12 includes an interpolating frame memory 12a that accumulates two input frames (previous frame and current frame), an interpolating frame generating portion 12b that generates an interpolating frame based on the two input frames from the interpolating frame memory 12a and the interpolating vector from the interpolating vector evaluating portion 11f, a time base conversion frame memory 12c for accumulating the input frames (previous frame and current frame), and a time base converting portion 12d that inserts the interpolating frame from the interpolating frame generating portion 12b into the input frames from the time base conversion frame memory 12c to generate an output image signal (RGB signal).

The interpolating frame generating portion 12b corresponds to an interpolation image generating portion of the present invention and the time base converting portion 12d corresponds to an image interpolating portion of the present invention.

Figure 5:
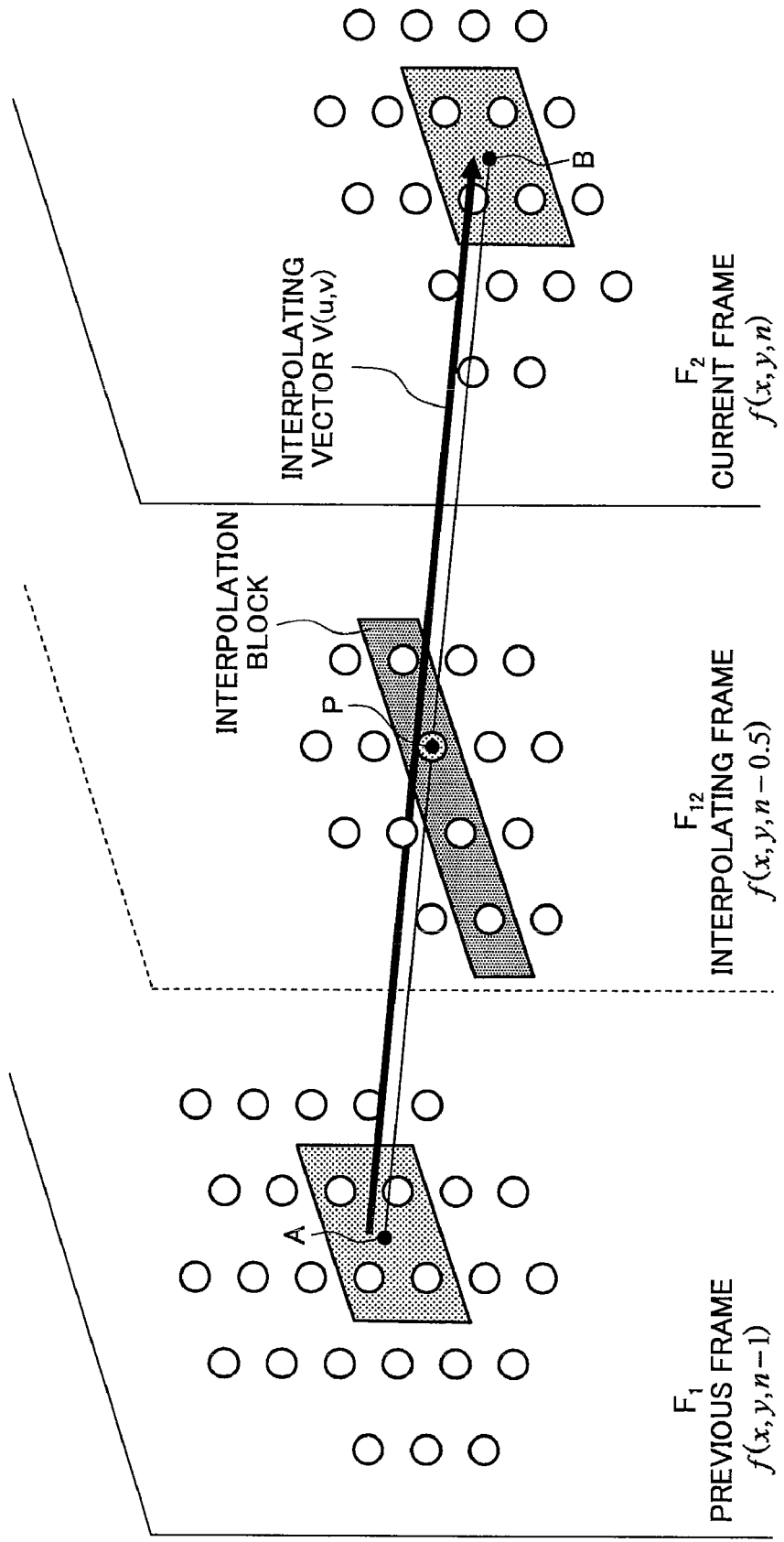
FIG. 5 is a diagram for explaining an example of an interpolating frame generating processing of a frame generating portion.

FIG. 5 is a diagram for explaining an example of the interpolating frame generating processing of the frame generating portion 12. The interpolating frame generating portion 12b stretches an interpolating vector V allocated to the interpolation block into the previous frame and the current frame and uses pixels located adjacent to the intersecting points with the frames to interpolate the pixels in the interpolation block. For example, in the previous frame $F_1$, the luminance of a point A is calculated from three adjacent points. In the current frame $F_2$, the luminance of a point B is calculated from three adjacent points. In the interpolating frame $F_{12}$, the luminance of a point P is interpolated using the luminance of the points A and B. The luminance of the point P may be an average of the luminance of the point A and the luminance of the point B, for example.

The interpolating frame $F_{12}$ generated as above is sent to the time base converting portion 12d. The time base converting portion 12d sandwiches the interpolating frame $F_{12}$ between the previous frame $F_1$ and the current frame $F_2$ to perform processing of converting a frame rate. In this way, the FRC portion 10 may convert the input image signal (60 frames/sec) into a motion-compensated output image signal (120 frames/sec), which may be output to a display panel to reduce the motion blur and improve the moving image quality. Although the 60-frame/sec input image signal is converted into the 120-frame/sec (double) output image signal in the frame rate conversion of this description, this is obviously applicable to the case of acquiring 90-frame/sec (1.5 times) and 180-frame/sec (three times) output image signals, for example.

The image displaying device of the present invention includes the FRC portion 10 shown in FIG. 5 and the main object thereof is to make the motion compensation processing of the FRC portion 10 ineffective over the entire screen (full screen) to prevent the image quality deterioration due to the FRC processing when the degree of deterioration of an input image signal is equal to or higher than a predetermined value. Although the present invention is applicable to general image displaying devices having the hold-type display characteristics such as liquid crystal displays, organic EL displays, and electrophoretic displays, a representative example described in the following embodiments will be the case of applying the present invention to a liquid crystal displaying device using a liquid crystal display panel for a display panel.

In a first embodiment of the present invention, when the S/N ratio of an input image signal drops to the value that is equal to or lower than a predetermined value, the output of the motion vector detecting portion 11e is forced to be zero-vector to make the motion compensation processing of the FRC portion 10 ineffective.

Figure 6:
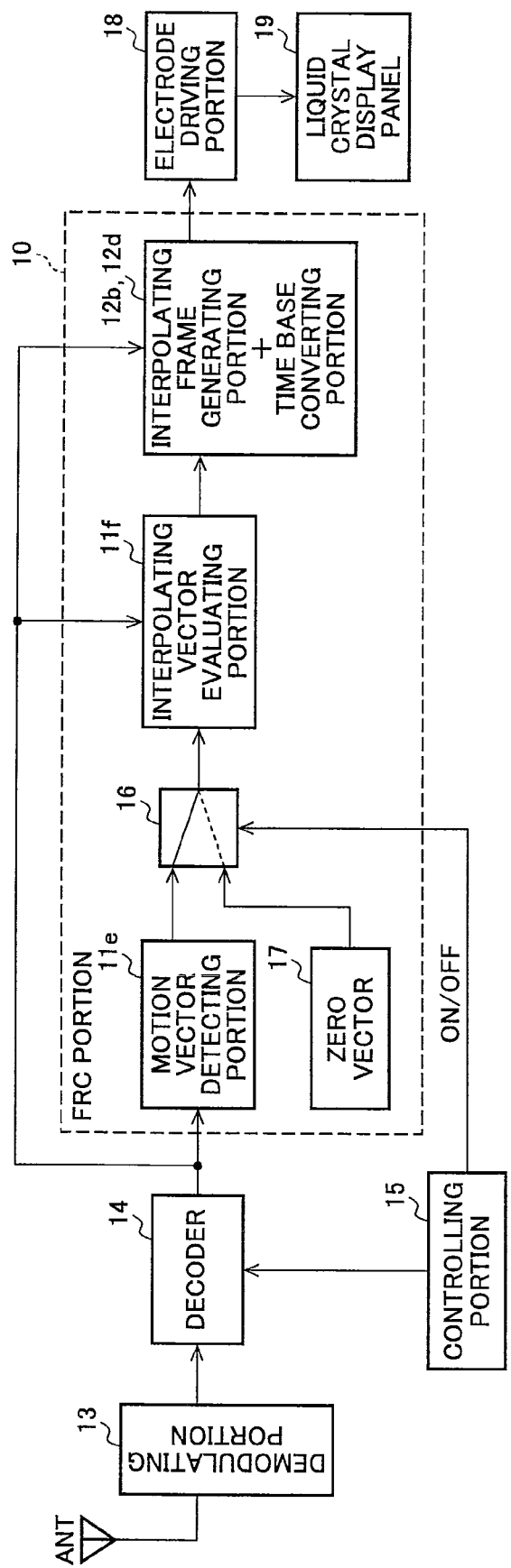
FIG. 6 is a block diagram of an exemplary main configuration of a liquid crystal television receiver according to a first embodiment of the present invention.

FIG. 6 is a block diagram of an exemplary main configuration of a liquid crystal television receiver according to the first embodiment of the present invention and the liquid crystal television receiver includes the FRC portion 10, a demodulating portion 13, a decoder 14, a controlling portion 15, a switching portion 16, a zero-vector portion 17, an electrode driving portion 18, and a liquid crystal display panel 19. The switching portion 16 is disposed between the motion vector detecting portion 11e and the interpolating vector evaluating portion 11f within the FRC portion 10 and switches over the motion vector from the motion vector detecting portion 11e to the zero-vector 17 in accordance with the instruction from the controlling portion 15.

The demodulating portion 13 executes a digital demodulating processing, an error correcting processing, etc. after executing a station-selection operation to a digital television broadcasting signal received by an antenna ANT. The decoder 14 applies a decoding processing to image data from the demodulating portion 13, outputs the demodulated image data to the FRC portion in the rear stage, detects the S/N ratio of the demodulated image signal, and detects and outputs the S/N ratio of the demodulated image signal to the controlling portion 15.

The controlling portion 15 determines the degree of deterioration of the input image signal to the FRC portion 10 based on the S/N ratio from the decoder 14 and controls the motion compensation processing of the FRC portion 10 according to the result of the determination. That is, when the S/N ratio of the input image signal drops the value that is equal to or lower than a predetermined value, the controlling portion 15 controls to make the motion compensation processing in the FRC portion 10 ineffective.

The liquid crystal display panel 19 is an active-matrix liquid crystal display that has a liquid crystal layer and electrodes for applying scan signals and data signals to the liquid crystal layer. The electrode driving portion 18 is a display driver for driving the scan electrodes and the data electrodes of the liquid crystal display panel 19 based on the image signal to which the frame rate conversion by the FRC portion 10 has been given.

The drive frequency of the liquid crystal display panel 19 is a frame frequency converted by the FRC portion 10. Therefore, if an image signal input with a frame frequency of 60 Hz is converted by the FRC portion 10 into a frame frequency of 120 Hz, the drive frequency of the liquid crystal display panel 19 is 120 Hz. However, if the frame frequency conversion of the FRC processing is not performed and the input image signal is directly displayed and output, the drive frequency of the liquid crystal display panel 19 is the frame frequency of the input image signal.

When the S/N ratio of an input image signal drops to the value that is equal to or lower than a predetermined value, the controlling portion 15 determines that the degree of deterioration of the input image signal is high and switches the switching portion 16 to the zero-vector 17 to forcibly replace the motion vector detected by the motion vector detecting portion 11e with the zero-vector. When the S/N ratio of the input image signal is maintained at predetermined level, the switching portion 16 is switched to the motion vector detecting portion 11e to input the motion vector detected by the motion vector detecting portion 11e to the interpolating vector evaluating portion 11f.

In this manner, when an ordinary moving image with less deterioration of video image is displayed, the moving image quality may be improved by the motion compensated FRC processing, and when an image signal with a high degree of deterioration of video image is input, the detection errors, the motion compensation errors, etc., of the motion vector due to noise are eliminated and the image quality may effectively be prevented from deteriorating due to the motion-compensated FRC processing by making the motion compensation processing ineffective with the motion vector set to zero-vector.

In a second embodiment of the present invention, when the degree of deterioration of an input image signal is equal to or higher than a predetermined value, the interpolating vector from the interpolating vector evaluating portion 11f is set to zero-vector to make the motion compensation processing of the FRC portion 10 ineffective so that no interpolation can occur between pixels located at different positions.

Figure 7:
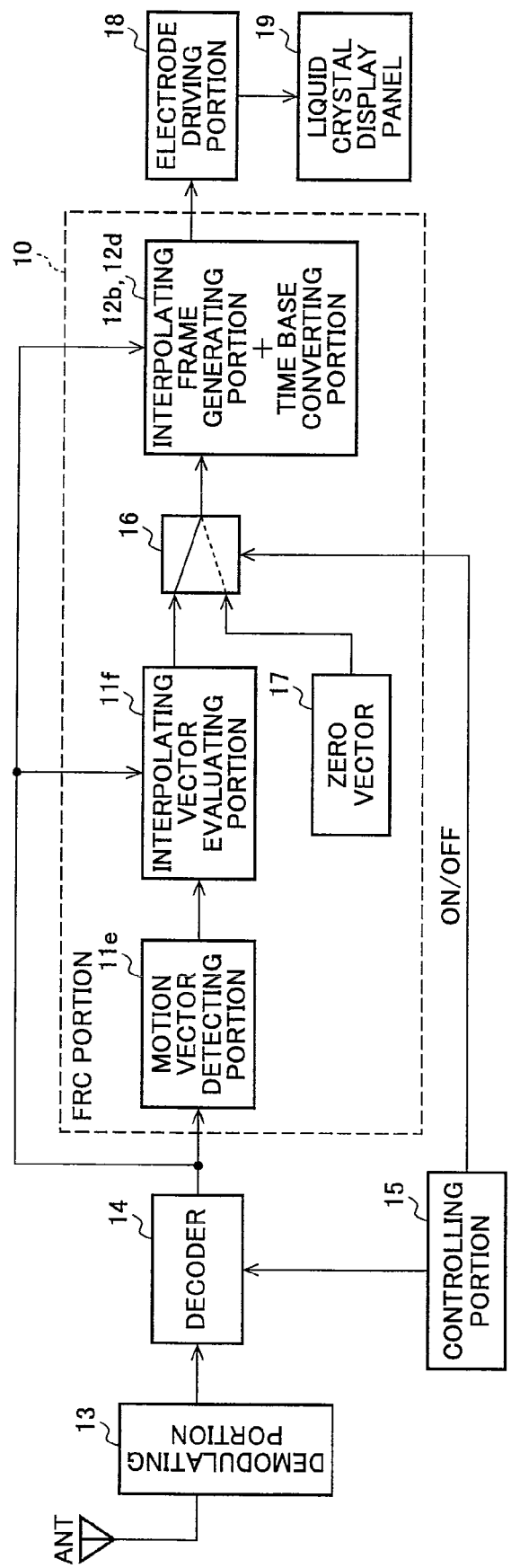
FIG. 7 is a block diagram of an exemplary main configuration of a liquid crystal television receiver according to a second embodiment of the present invention.

FIG. 7 is a block diagram of an exemplary main configuration of a liquid crystal television receiver according to the second embodiment of the present invention and the liquid crystal television receiver includes the FRC portion 10, the demodulating portion 13, the decoder 14, the controlling portion 15, the switching portion 16, the zero-vector portion 17, the electrode driving portion 18, and the liquid crystal display panel 19. The switching portion 16 is disposed between the interpolating vector evaluating portion 11f and the interpolating frame generating portion 12b within the FRC portion 10 and switches the interpolating vector from the interpolating vector evaluating portion 11f to the zero-vector 17 in accordance with the instruction from the controlling portion 15.

When the S/N ratio of an input image signal drops to the value that is equal to or lower than a predetermined value, the controlling portion 15 determines that the degree of deterioration of the input image signal is high and switches the switching portion to the zero-vector 17 to set the interpolating vector allocated by the interpolating vector evaluating portion 11f to zero-vector. When the S/N ratio of the input image signal is maintained at predetermined level, the switching portion 16 is switched to the interpolating vector evaluating portion 11f to input the interpolating vector allocated by the interpolating vector evaluating portion 11f to the interpolating frame generating portion 12b.

In this manner, when an ordinary moving image with less deterioration of video image is displayed, the moving image quality may be improved by the motion compensated FRC processing, and when an image signal with a high degree of deterioration of video image is input, the detection errors, the motion compensation errors, etc., of the motion vector due to noise are eliminated and the image quality may effectively be prevented from deteriorating due to the motion-compensated FRC processing by making the motion compensation processing ineffective with the interpolating vector set to zero-vector.

In a third embodiment of the present invention, a path is provided to bypass the FRC portion 10 and, when the degree of deterioration of an input image signal is equal to or higher than a predetermined value, the input image signal is input to the bypass to change the drive frequency of the liquid crystal display panel 19 in conformity with the frame frequency of the input image signal. When an image signal with a high degree of deterioration of video image is input, the switching is performed such that the input image signal is directly output and displayed on the liquid crystal display panel 19 without performing the frame rate conversion.

Figure 8:
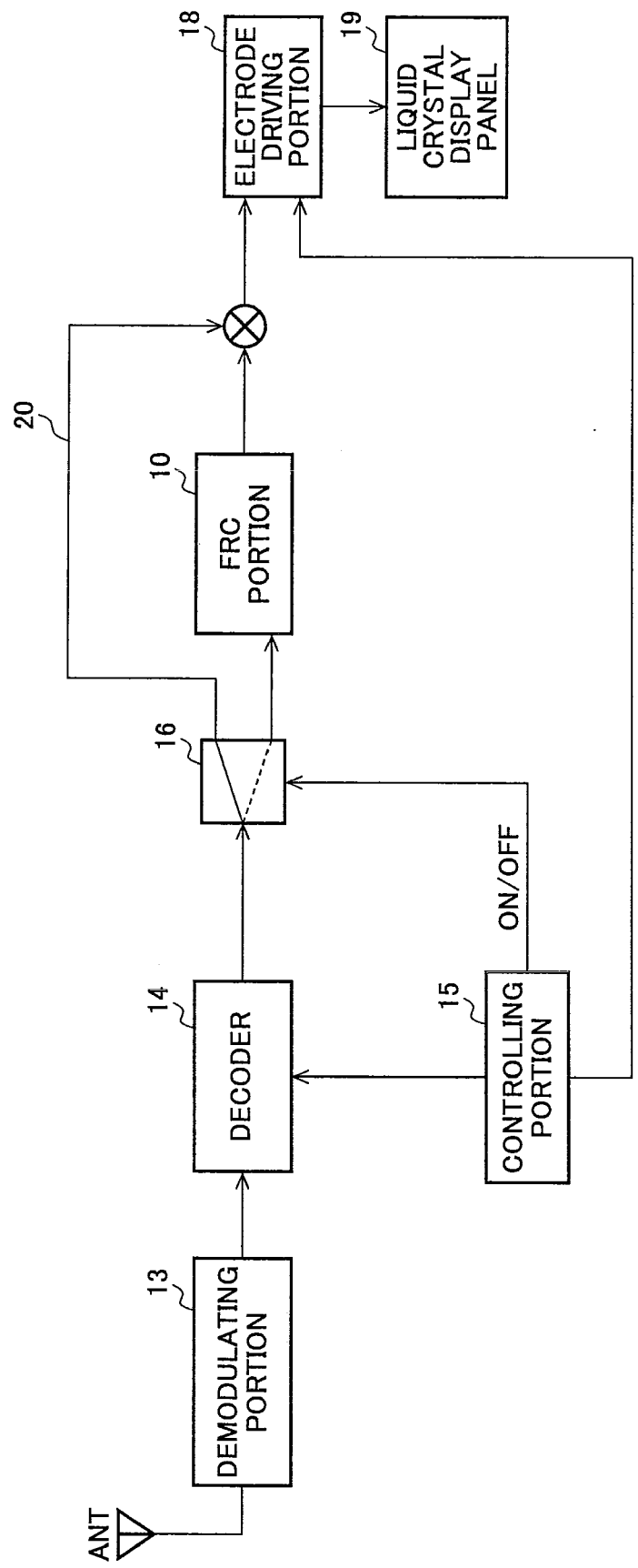
FIG. 8 is a block diagram of an exemplary main configuration of a liquid crystal television receiver according to a third embodiment of the present invention.

FIG. 8 is a block diagram of an exemplary main configuration of a liquid crystal television receiver according to the third embodiment of the present invention and the liquid crystal television receiver includes the FRC portion 10, the demodulating portion 13, the decoder 14, the controlling portion 15, the switching portion 16, the electrode driving portion 18, the liquid crystal display panel 19, and a path 20 for bypassing the FRC portion 10. The switching portion 16 is disposed on the previous stage of the FRC portion 10 and switches the input image signal to input whether to the FRC portion 10 or to the path 20 in accordance with the instruction from the controlling portion 15.

When the S/N ratio of an input image signal drops to the value that is equal to or lower than a predetermined value, the controlling portion 15 determines that the degree of the deterioration of the input image signal is high and shifts the switching portion 16 to the path 20 to bypass the FRC portion 10. When the S/N ratio of the input image signal is maintained at predetermined level, the switching portion 16 is shifted to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the path 20 are switched over to output to the liquid crystal display panel 19.

In this embodiment, the controlling portion 15 may change the drive frequency of the liquid crystal display panel 19, and when the image signal with the lowered S/N ratio is input, the input image signal is input to the path 20 to change the drive frequency of the liquid crystal display panel 19 in conformity with the frame frequency of the input image signal.

Figure 9:
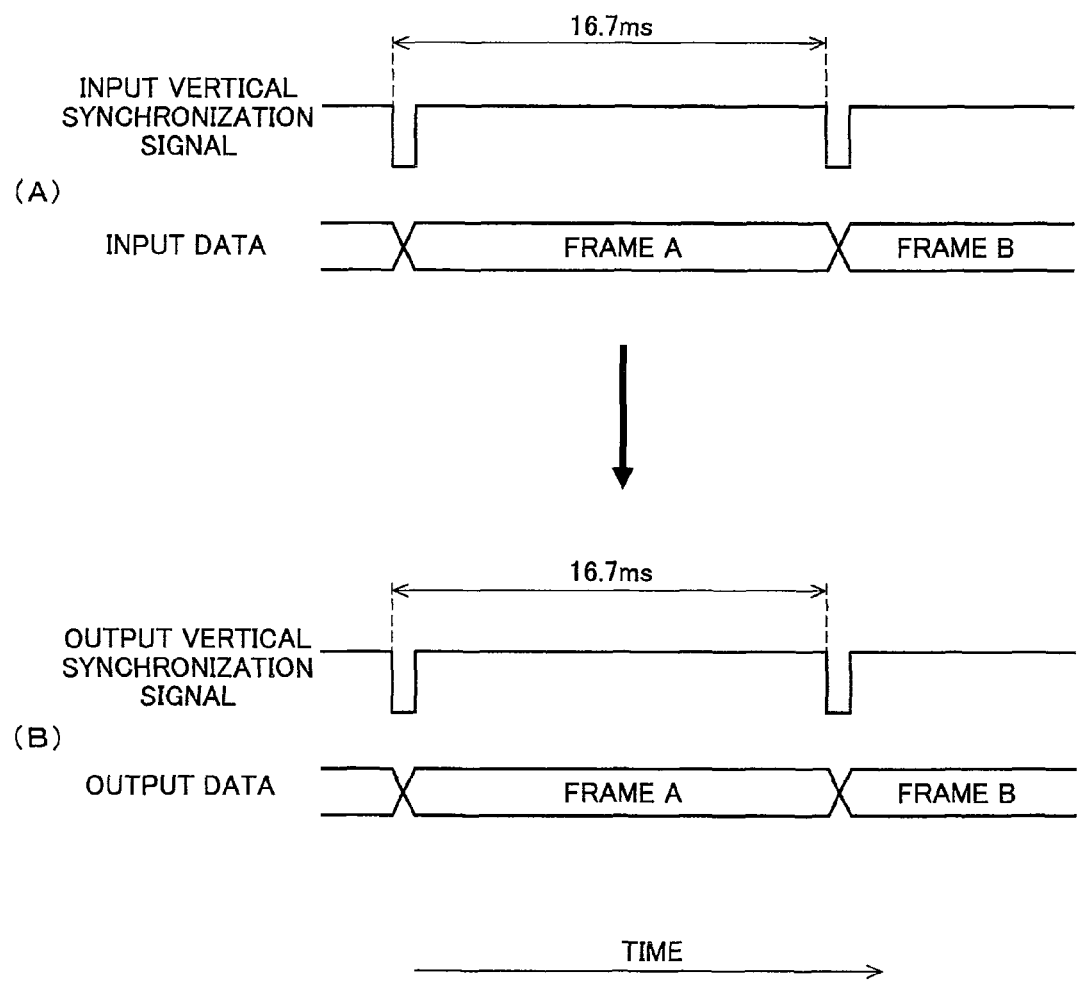
FIG. 9 is a diagram of a relationship between input data and output data according to the third embodiment of the present invention.

FIG. 9 is a diagram of a relationship between input data and output data according to the third embodiment of the present invention. FIG. 9(A) depicts the input data to the path 20 and FIG. 9(B) depicts the output data from the path 20. As shown in FIG. 9(A), if the input image signal (input data) is input to the path 20 with a frame frequency of 60 Hz, the display time per frame is about 16.7 ms. The controlling portion 15 controls the electrode driving portion 18, which is the display driver, to change the drive frequency of the liquid crystal display panel 19 from 120 Hz to 60 Hz and causes the input data to be output from the path 20 at 60 Hz without performing the frame rate conversion as shown in FIG. 9(B).

Since the liquid crystal display panel 19 displays the frame output from the path 20 without the frame rate conversion at the drive frequency of 60 Hz, the display time per frame is still about 16.7 ms.

In this manner, when an ordinary moving image with less deterioration of video image is displayed, the moving image quality may be improved by the motion compensated FRC processing, and when an image signal with a high degree of deterioration of video image is input, the detection errors, the motion compensation errors, etc., of the motion vector due to noise are eliminated and the image quality may effectively be prevented from deteriorating due to the motion-compensated FRC processing by prohibiting the frame rate conversion itself with the FRC processing bypassed.

In a fourth embodiment of the present invention, a path is provided to bypass the FRC portion 10 and, when the degree of deterioration of an input image signal is equal to or higher than a predetermined value, the input image signal is input to the bypass to accumulate the input image signal in a memory on the path and the frame rate is converted by rapidly and repeatedly reading the image signal of the same frame from the memory more than once. When an image signal with a high degree of deterioration of video image is input, the switching is performed such that the input image signal is rapidly and sequentially output to convert the frame rate and is output and displayed on the liquid crystal display panel 19 without performing the motion-compensated frame rate conversion.

Figure 10:
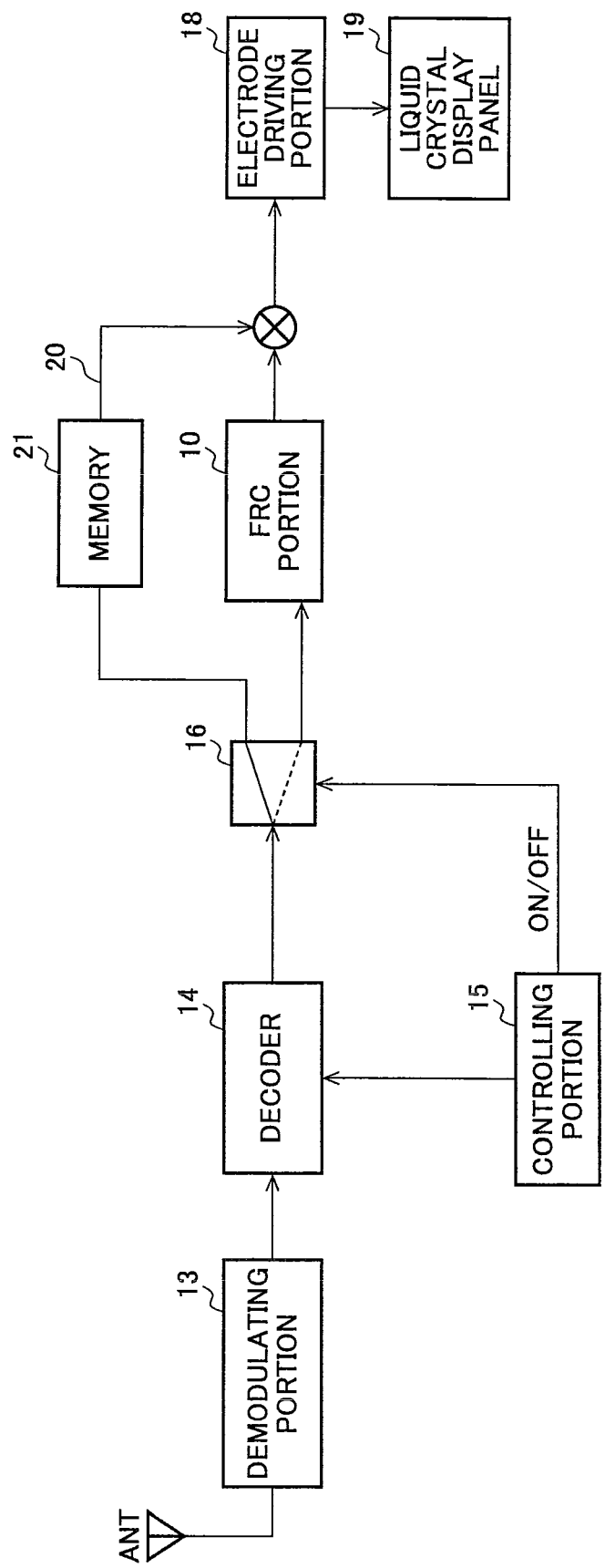
FIG. 10 is a block diagram of an exemplary main configuration of a liquid crystal television receiver according to a fourth embodiment of the present invention.

FIG. 10 is a block diagram of an exemplary main configuration of a liquid crystal television receiver according to the fourth embodiment of the present invention and the liquid crystal television receiver includes the FRC portion 10, the demodulating portion 13, the decoder 14, the controlling portion 15, the switching portion 16, the electrode driving portion 18, the liquid crystal display panel 19, the path 20 for bypassing the FRC portion 10, and a memory 21 on the path 20. The switching portion 16 is disposed on the previous stage of the FRC portion 10 and switches the input image signal to input whether to the FRC portion 10 or to the path 20 in accordance with the instruction from the controlling portion 15.

When the S/N ratio of an input image signal drops to the value that is equal to or lower than a predetermined value, the controlling portion 15 determines that the degree of the deterioration of the input image signal is high and shifts the switching portion 16 to the path 20 to bypass the FRC portion 10 and to accumulate the input image signal in the memory 21. The frame insert processing is subsequently performed by repeatedly reading the same frame from the memory 21 more than once. When the S/N ratio of the input image signal is maintained at predetermined level, the switching portion 16 is switched to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the memory 21 are switched over to output to the liquid crystal display panel 19.

In this embodiment, the drive frequency of the liquid crystal display panel 19 is not changed and is maintained at 120 Hz. When an image signal with lowered S/N ratio is input, the controlling portion 15 and the memory 22 comprise a means for inserting an image signal of the previous or subsequent frame between the frames of the input image signal to convert the number of frames of the input image signal. The frame rate (the number of frames) of the display image signal input to the electrode driving portion 18 is always the same.

Figure 11:
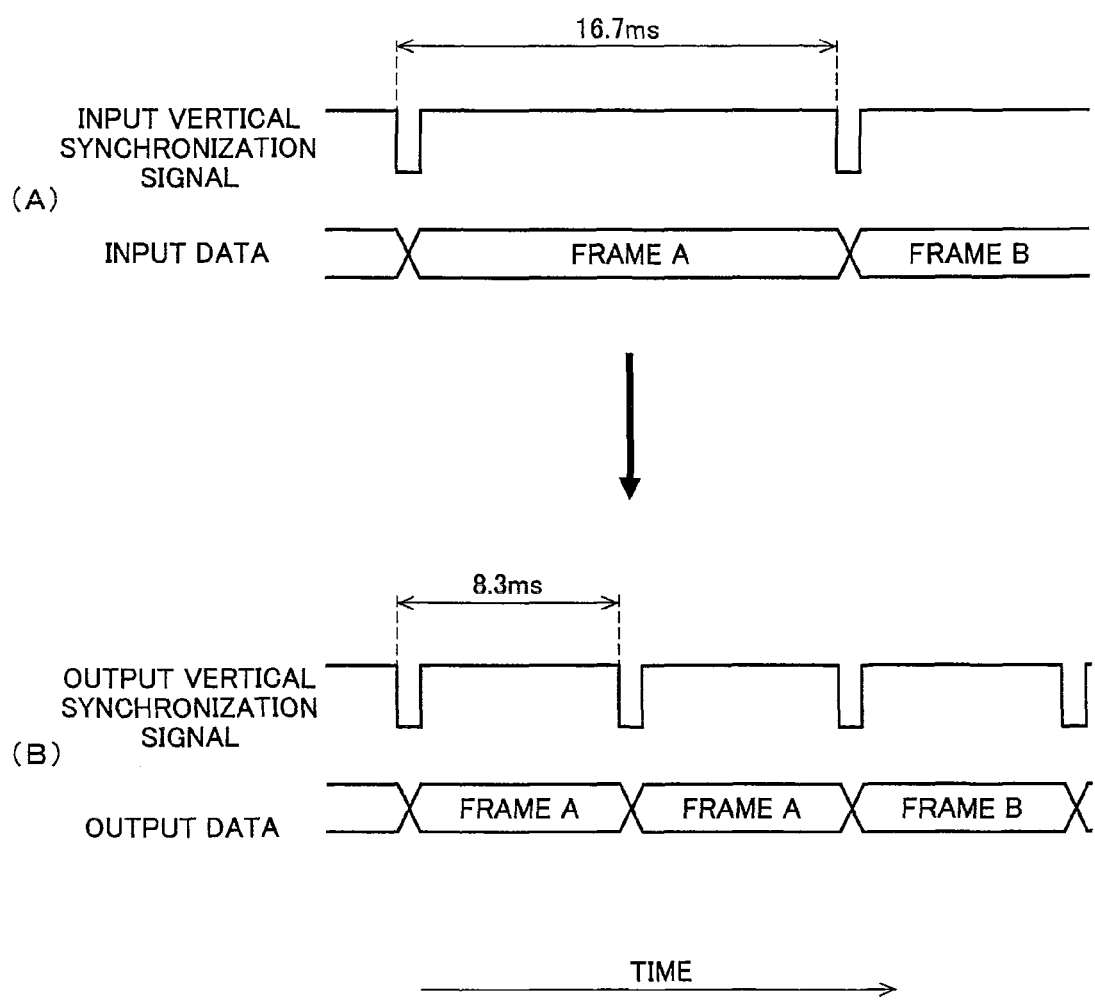
FIG. 11 is a diagram of a relationship between input data and output data according to the fourth embodiment of the present invention.

FIG. 11 is a view of a relationship between input data and output data according to the fourth embodiment of the present invention. FIG. 11(A) shows the input data to the path 20 and FIG. 11(B) shows the output data from the path 20. As shown in FIG. 11(A), if the input image signal (input data) is input to the path 20 with a frame frequency of 60 Hz, the display time per frame is about 16.7 ms. The input data are temporarily accumulated in the memory 21, and an image signal of the frame (in FIG. 11, frame A) is output which is repeatedly read from the memory 21 at double speed as shown in FIG. 11(B).

The liquid crystal display panel 19 displays the output data into which the image signal of the same frame has been inserted, at the drive frequency of 120 Hz. Since the number of frames is converted by repeatedly reading the same frame twice, the display time per frame is about 8.3 ms in this case.

In this manner, when an ordinary moving image with less deterioration of video image is displayed, the moving image quality may be improved by the motion compensated FRC processing, and when an image signal with a high degree of deterioration of video image is input, the detection errors, the motion compensation errors, etc., of the motion vector due to noise are eliminated and the image quality may effectively be prevented from deteriorating due to the motion-compensated FRC processing by not performing the interpolation processing through motion compensation for the input image signal. Since the frame rate is converted by repeatedly reading the same frame in this case, the drive frequency of the liquid crystal display panel 19 does not need to be changed.

In a fifth embodiment of the present invention, a path is provided to bypass the FRC portion 10 and, when the degree of deterioration of an input image signal is equal to or higher than a predetermined value, the input image signal is input to the bypass and the input image signal is input to a linear interpolation processing portion on the path to interpolate an image signal to which the linear interpolation has been performed. That is, when an image signal with a high degree of deterioration of video image is input, the switching is performed such that the frame rate is converted by performing the linear interpolation processing rather than the interpolation processing through motion compensation.

Figure 12:
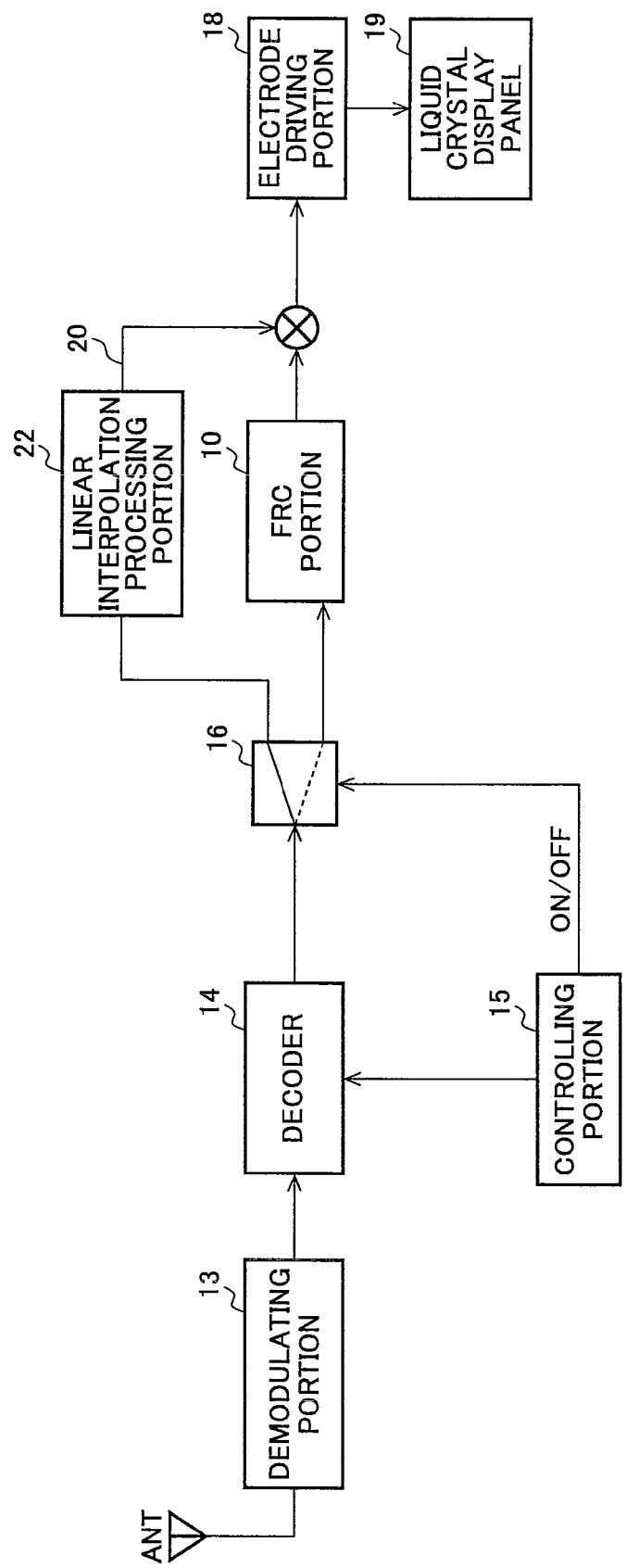
FIG. 12 is a block diagram of an exemplary main configuration of a liquid crystal television receiver according to a fifth embodiment of the present invention.

FIG. 12 is a block diagram of an exemplary main configuration of a liquid crystal television receiver according to the fifth embodiment of the present invention and the liquid crystal television receiver includes the FRC portion 10, the demodulating portion 13, the decoder 14, the controlling portion 15, the switching portion 16, the electrode driving portion 18, the liquid crystal display panel 19, the path 20 for bypassing the FRC portion 10, and a linear interpolation processing portion 22 on the path 20. The switching portion 16 is disposed on the previous stage of the FRC portion 10 and switches the input image signal to input whether to the FRC portion 10 or to the path 20 in accordance with the instruction from the controlling portion 15.

When the S/N ratio of an input image signal drops to the value that is equal to or lower than a predetermined value, the controlling portion 15 determines that the degree of the deterioration of the input image signal is high and shifts the switching portion 16 to the path 20 to bypass the FRC portion 10 and the input image signal is input to the linear interpolation processing portion 22. The linear interpolation processing portion 22 inserts an interpolating frame to which the linear interpolation processing has been given between frames. When the S/N ratio of the input image signal is maintained at predetermined level, the switching portion 16 is switched to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the linear interpolation processing portion 22 are switched over to output to the liquid crystal display panel 19.

In this embodiment, the drive frequency of the liquid crystal display panel 19 is not changed and is maintained at 120 Hz. The frame rate (the number of frames) of the display image signal input to the electrode driving portion 18 is always the same. When an image signal with lowered S/N ratio is input, the linear interpolation processing portion 22 comprises a means for interpolating an image signal to which the linear interpolation processing has been given between the frames of the input image signal to convert the number of frames of the input image signal. In the linear interpolation processing, as described in the above document (Yamauchi Tatsuro, "TV Standards Conversion", Journal of the Institute of Television Engineers of Japan, Vol. 45, No. 12, pp. 1534-1543 (1991)), an interpolating frame is acquired through linear interpolation using a frame interpolation ratio α from the signal of the previous frame and the signal of the current frame.

Figure 13:
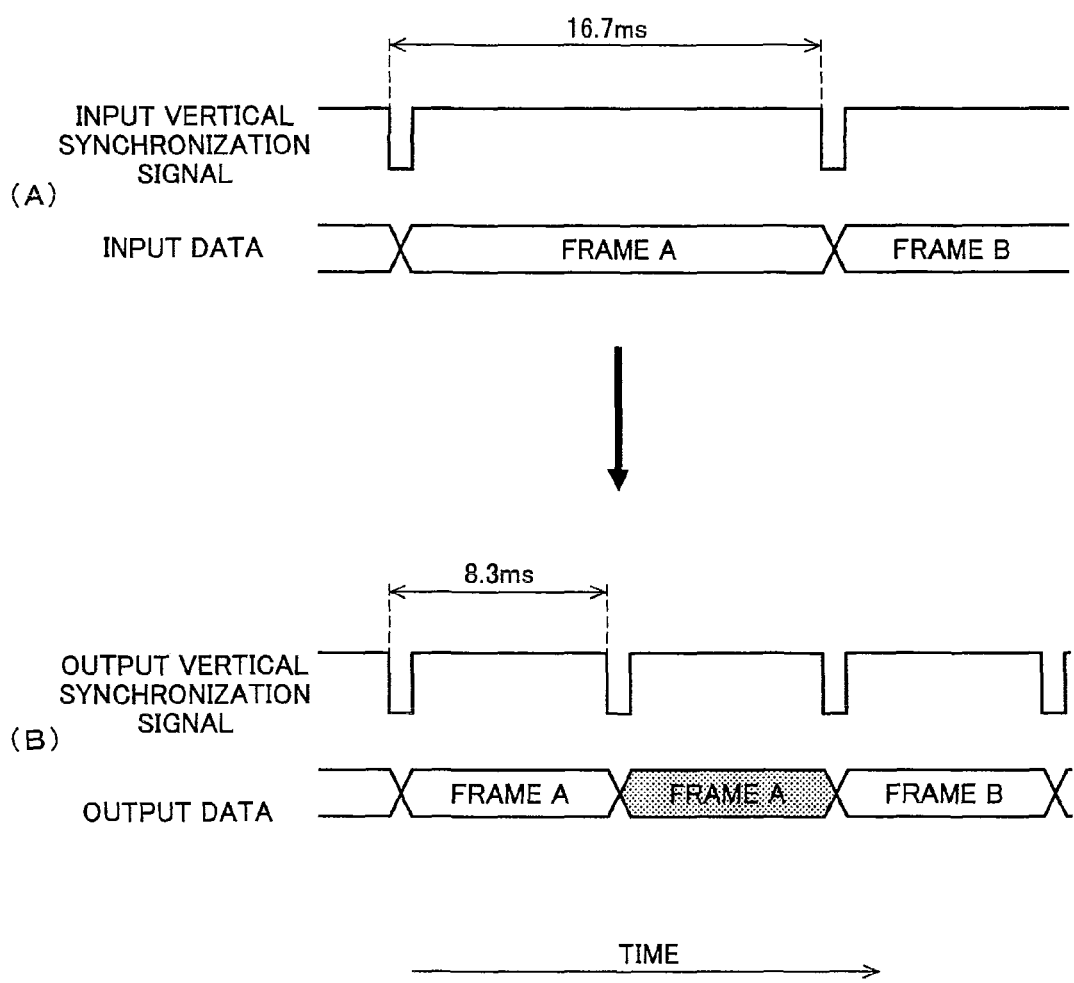
FIG. 13 is a diagram of a relationship between input data and output data according to the fifth embodiment of the present invention.

FIG. 13 is a view of a relationship between input data and output data according to the fifth embodiment of the present invention. FIG. 13(A) shows the input data to the path 20 and FIG. 13(B) shows the output data from the path 20. As shown in FIG. 13(A), if the input image signal (input data) is input to the path 20 with a frame frequency of 60 Hz, the display time per frame is about 16.7 ms. The input data are input to the linear interpolation processing portion 22, and the image signal to which the linear interpolation processing has been given (in FIG. 13, frame A+B) is interpolated and output between the frames (in this case, between frames A and B) as shown in FIG. 13(B).

The liquid crystal display panel 19 displays the output data into which the image signal to which the linear interpolation processing has been given, is interpolated at the drive frequency of 120 Hz. Since the number of frames is converted by interpolating the image signal to which the linear interpolation processing has been given, the display time per frame is about 8.3 ms in this case.

In this manner, when an ordinary moving image with less deterioration of video image is displayed, the moving image quality may be improved by the motion compensated FRC processing, and when an image signal with a high degree of deterioration of video image is input, the detection errors, the motion compensation errors, etc., of the motion vector due to noise are eliminated and the image quality may effectively be prevented from deteriorating due to the motion-compensated FRC processing by not performing the interpolation processing through motion compensation for the input image signal. Since the frame rate is converted by interpolating the image signal to which the linear interpolation processing has been given in this case, the drive frequency of the liquid crystal display panel 19 does not need to be changed.

In a sixth embodiment of the present invention, a path is provided to bypass the FRC portion 10 and, when the degree of deterioration of an input image signal is equal to or higher than a predetermined value, the input image signal is input to the bypass path and the input image signal is input to a black-level signal insertion processing portion on the path to insert a predetermined monochromatic image signal such as a black-level signal. That is, when an image signal with a high degree of deterioration of video image, the switching is performed such that the frame rate is converted by performing the monochromatic image insert processing rather than the interpolation processing through motion compensation.

Figure 14:
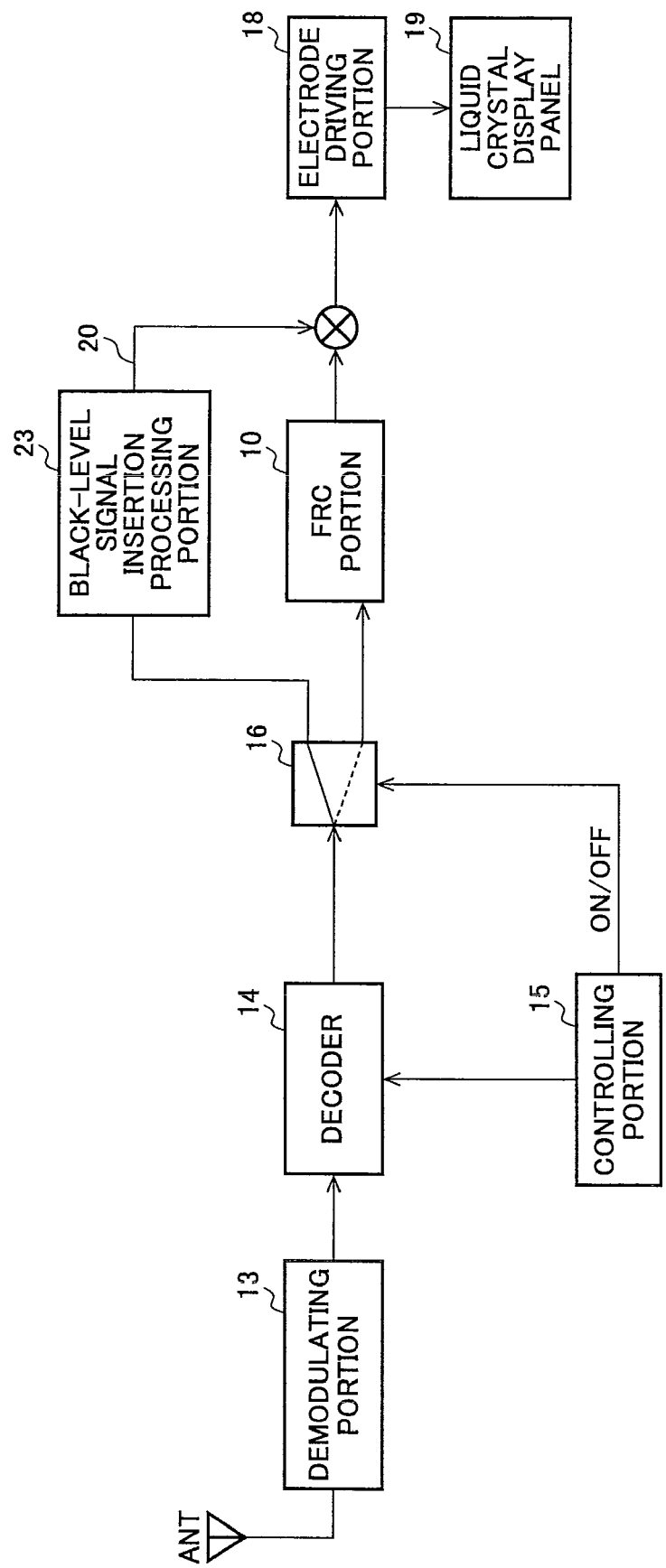
FIG. 14 is a block diagram of an exemplary main configuration of a liquid crystal television receiver according to a sixth embodiment of the present invention.

FIG. 14 is a block diagram of an exemplary main configuration of a liquid crystal television receiver according to the sixth embodiment of the present invention and the liquid crystal television receiver includes the FRC portion 10, the demodulating portion 13, the decoder 14, the controlling portion 15, the switching portion 16, the electrode driving portion 18, the liquid crystal display panel 19, the path 20 for bypassing the FRC portion 10, and a black-level signal insertion processing portion 23 on the path 20. The switching portion 16 is disposed on the previous stage of the FRC portion 10 and switches the input image signal to input whether to the FRC portion 10 or to the path 20 in accordance with the instruction from the controlling portion 15.

When the S/N ratio of an input image signal drops to the value that is equal to or lower than a predetermined value, the controlling portion 15 determines that the degree of the deterioration of the input image signal is high and shifts the switching portion 16 to the path 20 to bypass the FRC portion 10 and the input image signal is input to the black-level signal insertion processing portion 23. The black-level signal insertion processing portion 23 performs the time scale compression (frame rate conversion) for the input image signal, for example, with the use of a memory to insert the predetermined monochromatic image signal such as a black-level signal between the input frames. When the S/N ratio of the input image signal is maintained at predetermined level, the switching portion 16 is shifted to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the black-level signal insertion processing portion 23 are switched over to output to the liquid crystal display panel 19.

In this embodiment, the drive frequency of the liquid crystal display panel 19 is not changed and is maintained at 120 Hz. The frame rate (the number of frames) of the display image signal input to the electrode driving portion 18 is always the same. When an image signal with lowered S/N ratio is input, the black-level signal insertion processing portion 23 comprises a means for inserting the predetermined monochromatic image signal such as a black-level signal between the frames of the input image signal to convert the number of frames of the input image signal. Another embodiment of the black-level signal insertion processing may be configured such that the electrode driving portion 18 applies a voltage for writing black to the liquid crystal display panel 19 for a predetermined period (in the case of this example, $1/120$ second).

Figure 15:
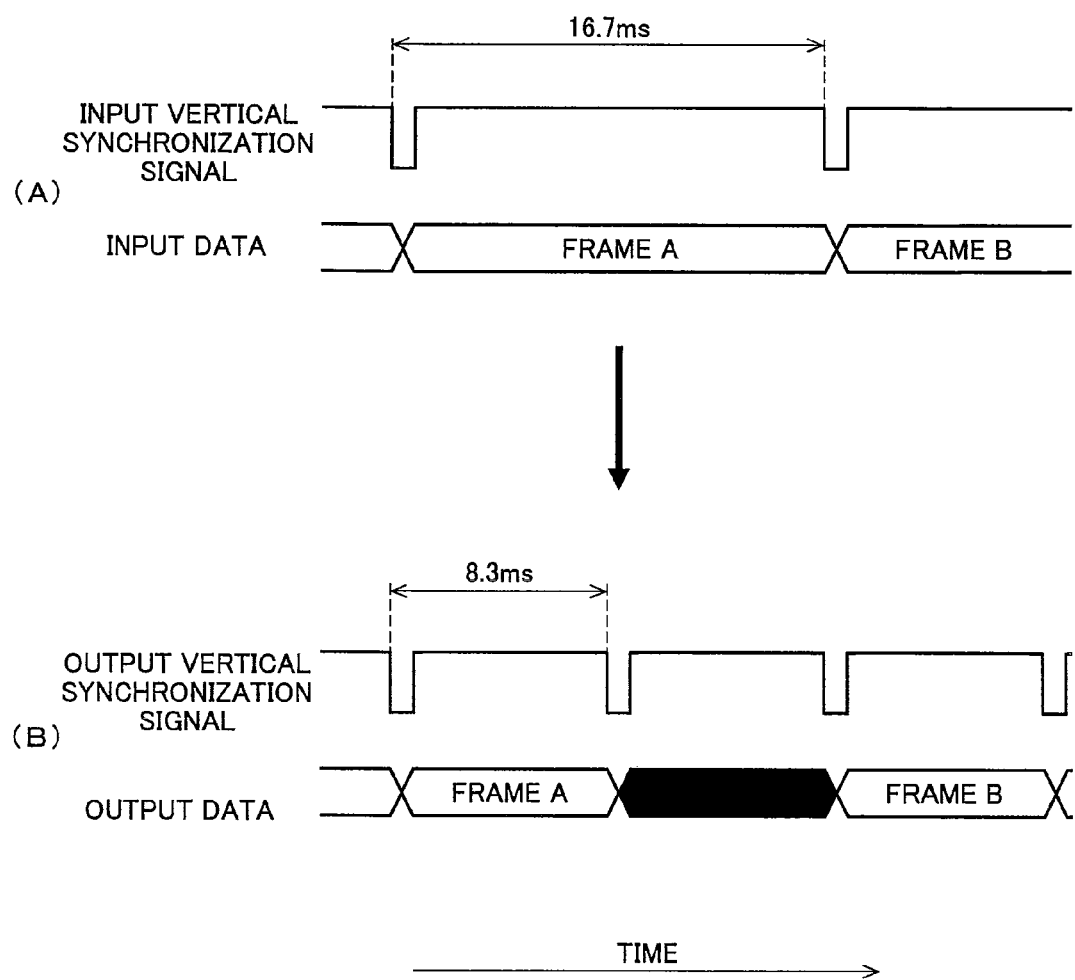
FIG. 15 is a diagram of a relationship between input data and output data according to the sixth embodiment of the present invention.

FIG. 15 is a view of a relationship between input data and output data according to the sixth embodiment of the present invention. FIG. 15(A) shows the input data to the path 20 and FIG. 15(B) shows the output data from the path 20. As shown in FIG. 15(A), if the input image signal (input data) is input to the path 20 with a frame frequency of 60 Hz, the display time per frame is about 16.7 ms. The input data are input to the black-level signal insertion processing portion 23, and a black-level signal (in FIG. 15, black-colored frame) is inserted and output between the frames (in this case, between the frames A and B) as shown in FIG. 15(B).

Although the image quality deterioration due to the motion blur is improved and the image quality deterioration due to the motion compensation error is not generated by inserting the black image signal between the frames of the input image signal in this way, the emission luminance must be increased in a backlight (not shown) disposed on the backside of the liquid crystal display panel 19 to compensate the reduction of the display luminance due to the shortening of the image display period.

The liquid crystal display panel 19 displays the output data, into which the black-level signal has been inserted, at the drive frequency of 120 Hz. Since the number of frames is converted by inserting the black-level signal, the display time per frame is about 8.3 ms in this case.

In this manner, when an ordinary moving image with less deterioration of video image is displayed, the moving image quality may be improved by the motion compensated FRC processing, and when an image signal with a high degree of deterioration of video image is input, the detection errors, the motion compensation errors, etc., of the motion vector due to noise are eliminated and the image quality may effectively be prevented from deteriorating due to the motion-compensated FRC processing by not performing the interpolation processing through motion compensation for the input image signal. Since the frame rate is converted by inserting the monochromatic image signal in this case, the drive frequency of the liquid crystal display panel 19 does not need to be changed. In addition in this case, the moving image quality improving effect is able to be maintained.

Other than the above embodiment, when the degree of deterioration of an input image signal is equal to or higher than a predetermined value, the image quality may be prevented from deteriorating due to the motion-compensated FRC processing and the moving image quality improving effect may be maintained at the same time by dividing the original image of the input frame into a plurality of frame images at a predetermined luminance ratio for the frame rate conversion.

In a seventh embodiment of the present invention, when the degree of deterioration of an input image signal is equal to or higher than a predetermined value, the compensation intensity of the motion compensation processing may be varied in the interpolating frame generating portion. Specifically, the weighted addition rate may be varied when the pull-down converted image signal is input by providing the interpolating frame generating portion that performs weighted addition of the image signal to which the motion compensation processing has been given and the image signal to which the linear interpolation processing has been given at a predetermined rate to generate an interpolating frame.

Figure 16:
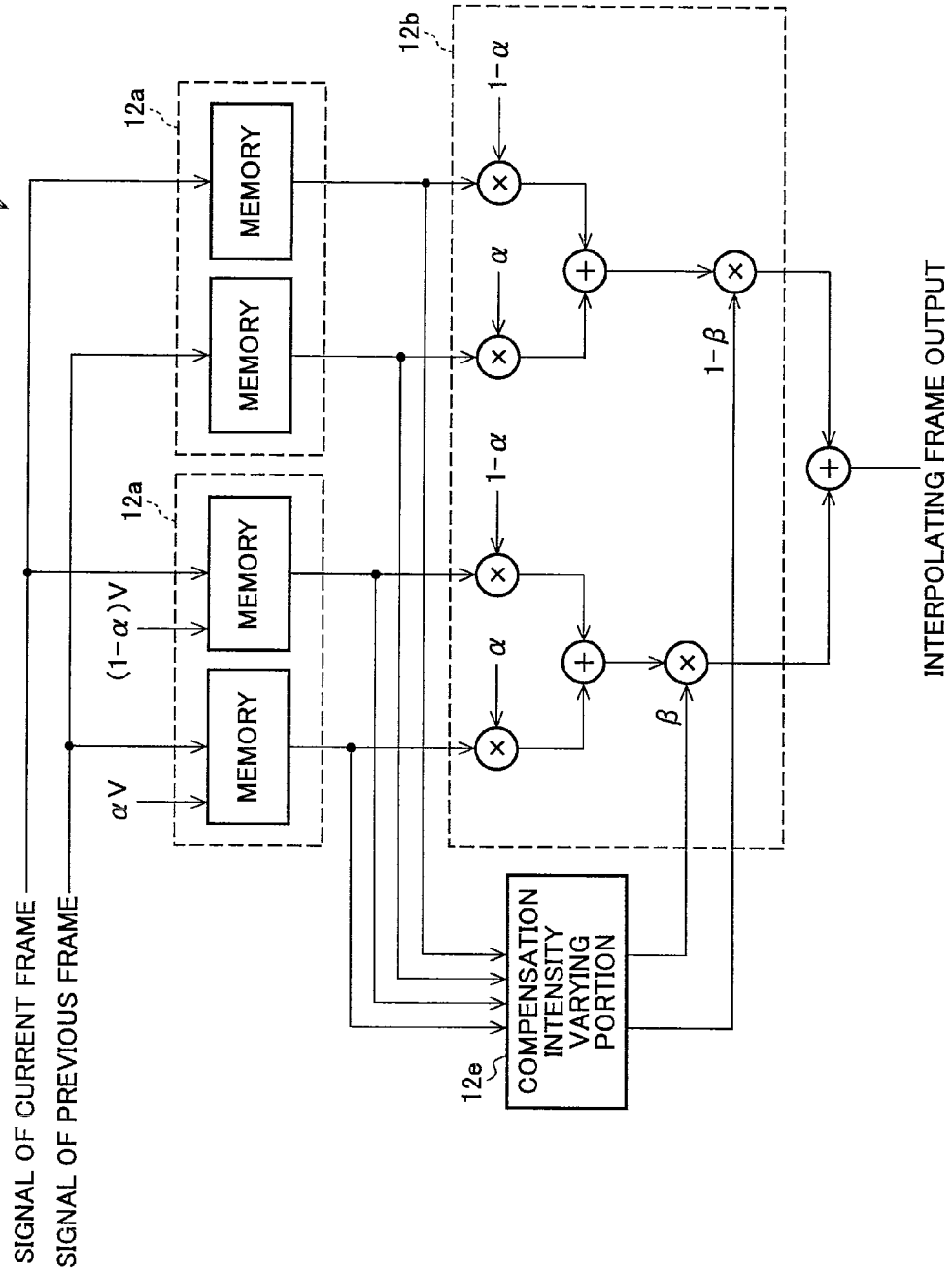
FIG. 16 is a block diagram of an exemplary main configuration of an FRC portion according to a seventh embodiment of the present invention.

FIG. 16 is a block diagram of an exemplary main configuration of the FRC portion 10 according to the seventh embodiment of the present invention, and the frame generating portion 12 of the FRC portion 10 includes the interpolating frame memory 12*a*, the interpolating frame generating portion 12*b*, and a compensation intensity varying portion 12*e* that may vary the compensation intensity of the motion compensation processing in the FRC portion 10. In FIG. 16, V denotes an interpolating vector; α denotes a frame interpolation ratio; and β denotes interpolation intensity (weighted addition rate).

Generally, for example, the frame interpolation through the linear interpolation between two frames and the frame interpolation using motion vectors (motion compensated interpolation) are known as methods of the frame interpolation processing. In the former case, an interpolating frame is acquired by the linear interpolation from the signal of the previous frame and the signal of the current frame at a frame interpolation ratio α. Therefore, using this linear interpolation may prevent the image quality deterioration due to the motion compensation errors in the FRC processing.

On the other hand, to acquire an interpolating frame from the previous frame and the current frame in the latter case, the interpolating vector V is detected from the motion vectors between the previous frame image and the current frame image, and the interpolating frame is acquired from the weighted addition of a signal of the previous frame image shifted by a degree of αV obtained by dividing the value (interpolating vector V) by the frame interpolation ratio α and a signal of the current frame image shifted by (1−α)V. Although good image quality may be acquired without deteriorating the resolution since a moving image itself is captured and compensated by using this motion-compensated interpolation, the image quality of a video image in which unsteadiness or view-display noise in an image occurs due to this processing may be deteriorated.

Therefore, in this embodiment, the compensation intensity varying portion 12*e* is disposed in the frame generating portion 12. When the S/N ratio of an input image signal drops to the value that is equal to or lower than a predetermined value and the degree of deterioration of the input image signal is determined to be high, the compensation intensity varying portion 12*e* varies the weighted addition rate β. The weighted addition rate β is a rate for performing the weighted addition of the image signal to which the motion compensation processing has been given and the image signal to which the linear interpolation processing has been given. The interpolating frame generating portion 12b of this embodiment performs the weighted addition of the linear interpolation and the motion-compensated interpolation in accordance with the weighted addition rate β to generate the interpolating frame.

For example, when an image signal with lowered S/N ratio is input, the compensation intensity varying portion 12e sets the weighted addition rate β=0 and defines the image signal to which the linear interpolation processing has been given as the interpolating frame to prevent the image deterioration. On the other hand, when the S/N ratio of an input image signal is maintained at a predetermined level, the weighted addition rate β=1 is set to define the image signal to which the motion compensation processing has been given as the interpolating frame to achieve better image quality for the moving image.

Since the weighted addition rate β may arbitrarily and variably be set, the rate may be set to a substantially intermediate value between zero and one. This enables to control the deterioration of the image quality and to perform the motion compensation in the interpolating frame image at the same time, and this may appropriately improve both the image quality deterioration due to the motion blur and the image quality deterioration due to the motion compensation errors.

Since the compensation intensity may be varied (weakened) in the motion compensation processing in the FRC when an image signal with a high degree of deterioration of video image is input, the image quality deterioration due to the motion-compensated FRC process may effectively be controlled by reducing the effects of the detection errors, the motion compensation errors, etc., of the motion vector due to noise.

Figure 17:
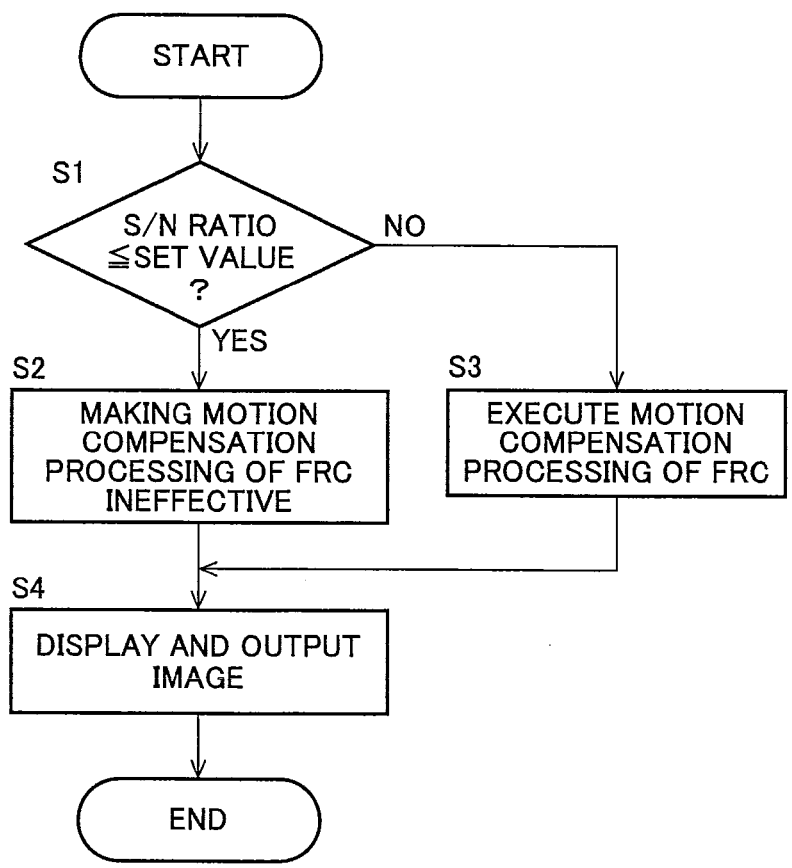
FIG. 17 is a flowchart for explaining an example of an image displaying method by the image displaying device of the present invention.

FIG. 17 is a flowchart for explaining an example of an image displaying method by the image displaying device of the present invention. An example of the image displaying method in the first embodiment will be described. First, the image displaying device determines whether the S/N ratio of the input image signal drops to the value that is equal to or lower than the predetermined value (step S1), and when it is determined that the S/N ratio of the input image signal drops to the value that is equal to or lower than the predetermined value (in the case of YES), the motion vector or the interpolating vector is set to zero-vector to make the motion compensation processing of the FRC portion 10 ineffective (step S2). When it is determined at step S1 that the S/N ratio of the input image signal does not drop to the value that is equal to or lower than the predetermined value (in the case of NO), it is determined whether the content type (genre) of the input image signal is "animation/special effects" (step S3).

Figure 18:
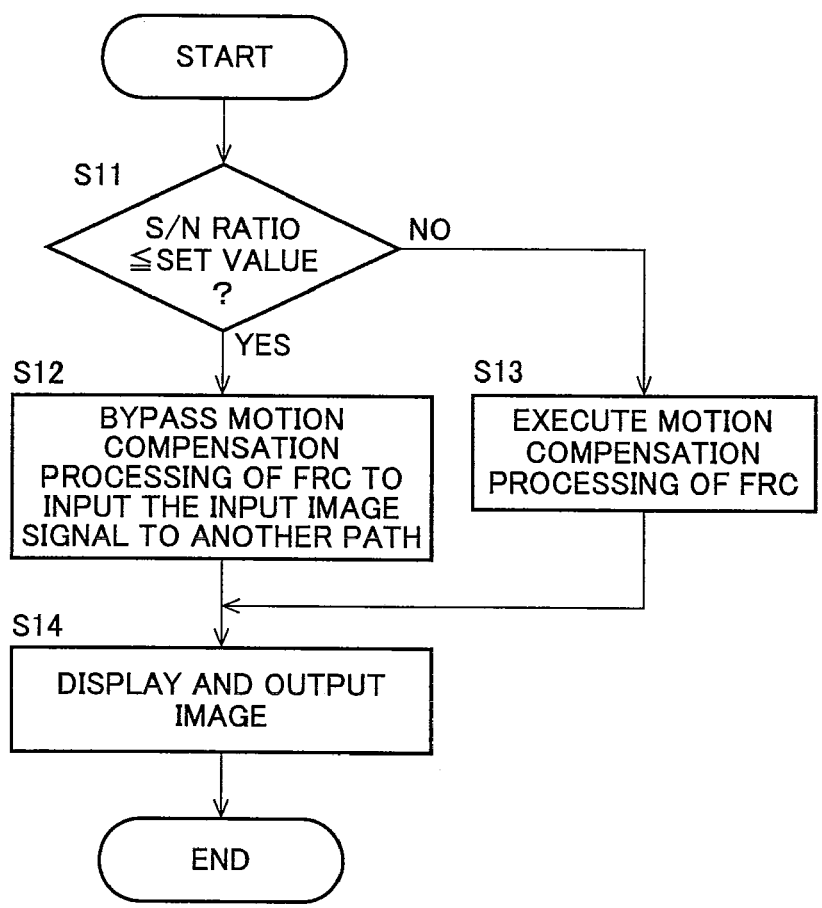
FIG. 18 is a flowchart for explaining another example of the image displaying method by the image displaying device of the present invention.

FIG. 18 is a flowchart for explaining another example of the image displaying method by the image displaying device of the present invention. An example of the image displaying method in the second to sixth embodiments will be described. First, the image displaying device determines whether the S/N ratio of the input image signal drops to the value that is equal to or lower than the predetermined value (step S11), and when it is determined that the S/N ratio of the input image signal drops to the value that is equal to or lower than the predetermined value (in the case of YES), the motion-compensated frame interpolation processing of the FRC portion 10 is bypassed and the input image signal is input to the other path 20 (step S12).

On the bypassing path 20, the image signal is output after the frame rate is converted by executing any one of the inter-frame interpolation of the image signal to which the linear interpolation processing has been given, the inter-frame interpolation of the image signal of the same frame, and the inter-frame interpolation of the predetermined monochromatic image signal such as a black-level signal, or the input image signal is directly output to execute processing such as changing the drive frequency of the liquid crystal display panel 19.

When it is determined at step S11 that the S/N ratio of the input image signal does not drop to the value that is equal to or lower than the predetermined value (the case of "NO"), the image signal is output that is given the motion-compensated interpolation processing of the FRC portion 10 (step S13). Finally, the image is displayed and output from the liquid crystal display panel 19 (step S14).

Figure 19:
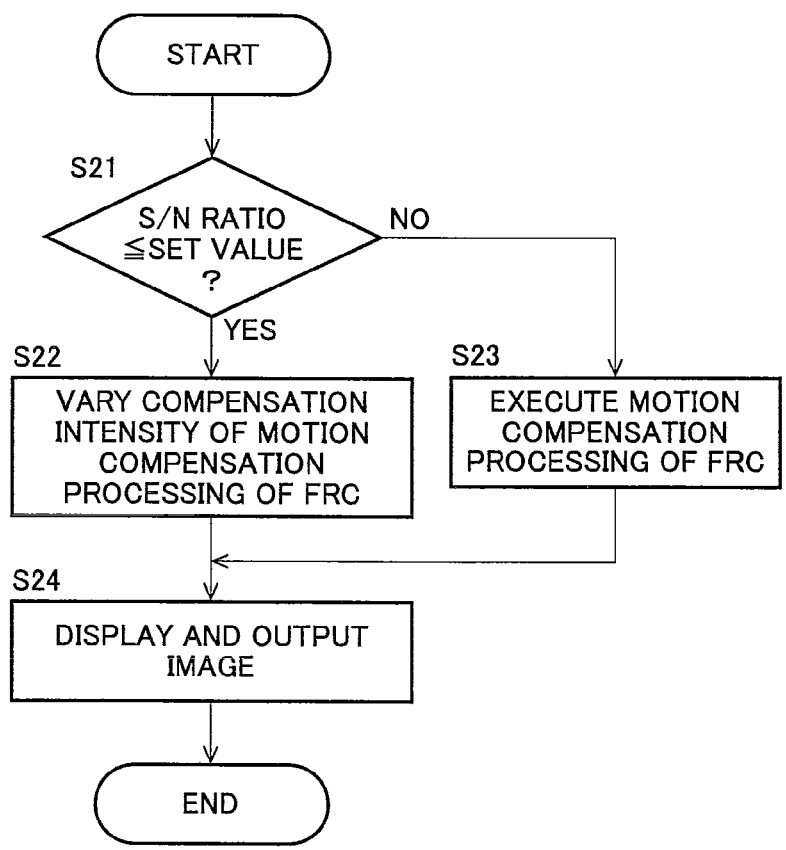
FIG. 19 is a flowchart for explaining another example of the image displaying method by the image displaying device of the present invention.

FIG. 19 is a flowchart for explaining another example of the image displaying method by the image displaying device of the present invention. An example of the image displaying method in the seventh embodiment will be described. First, the image displaying device determines whether the S/N ratio of the input image signal drops to the value that is equal to or lower than the predetermined value (step S21), and when it is determined that the S/N ratio of the input image signal drops to the value that is equal to or lower than the predetermined value (in the case of YES), the compensation intensity is varied (weakened) in the motion compensation processing of the FRC portion 10 (step S22). When it is determined at step S21 that the S/N ratio of the input image signal does not drop to the value that is equal to or lower than the predetermined value (in the case of NO), the compensation intensity is increased as usual in the motion compensation processing of the FRC portion 10 (step S23). The image signal with the frame frequency converted in this way is displayed and output from the liquid crystal display panel 19 (step S24).

According to the present invention, when the degree of deterioration of an input image signal is equal to or higher than a predetermined value, display and output may be performed by making the motion compensation processing in the frame rate converting (FRC) portion ineffective, and therefore, the image quality may effectively be prevented from deteriorating due to the motion compensation errors.

In each of the above embodiments, it is described that the degree of deterioration of an input image signal is determined based on the S/N ratio of the input image signal obtained by the decoder 14. However, it is obvious that the degree of deterioration of an input image signal may be determined based on various types of information without limiting to the above.

For example, when the C/N ratio (carrier/noise ratio) of a received video image signal is lowered, noise increases and causes deterioration of the video image, and therefore, this is likely to cause deterioration of the image quality due to motion compensation errors. Therefore, the image displaying device of the present invention may also be adapted to determine the degree of deterioration of an input image signal based on the C/N ratio obtained by a tuner in the demodulating portion 13 and properly control the motion compensation processing in the frame rate converting (FRC) portion.

When data errors in the received video image signal increase, noise also increases and causes deterioration of the video image. Therefore, this is likely to cause deterioration of the image quality due to motion compensation errors. Therefore, the image displaying device of the present invention may also be adapted to determine the degree of deterioration of an input image signal based on "the number of errors detected/the number of errors corrected" obtained by an error correcting portion in the demodulating portion 13 and properly control the motion compensation processing in the frame rate converting (FRC) portion.

When the reception state of a television broadcasting signal (the state of the wave) is worsened, noise increases and causes deterioration of the video image. Therefore, this is likely to cause deterioration of the image quality due to motion compensation errors. Therefore, the image displaying device of the present invention may also be adapted to determine the degree of deterioration of an input image signal based on the received electric field intensity of the received video image signal obtained by the tuner in the demodulating portion 13 and properly control the motion compensation processing in the frame rate converting (FRC) portion. It is obvious that two or more of the above various types of information concerning the degree of deterioration of the video image may be combined and used for the determination of the degree of the deterioration of the input image signal.

In each of the above embodiments of the present invention, a television receiver that receives and displays a television broadcasting signal has been described. The image displaying device of the present invention is not limited to this television receiver and it is needless to say that the present invention may be applied to any image displaying device that is able to input and display an image signal, etc., reproduced from an external medium or an internal medium.

Although the exemplary embodiments related to the image processing device and method of the present invention have been described as above, the above description will facilitate understanding of an image processing program operable to drive a computer to execute the image processing method as a program and a program recording medium, which is a computer-readable recording medium having the image processing program recorded thereon.

Although the image processing device of the present invention is integrally disposed within the image displaying device in the form described in the above embodiments, the image processing device of the present invention is not limited to this form and it is needless to say that the image processing device may be disposed in video output devices such as various recording medium reproducing devices, for example.

The invention claimed is:

1. An image displaying device having a rate converting portion that interpolates an interpolation image signal between frames or fields of an input image signal to convert the number of frames or fields of the input image signal, further comprising
a determining portion that determines the degree of deterioration of the input image signal, wherein
the rate converting portion comprises an interpolation image generating portion that generates the interpolation image signal by applying a motion compensation processing to the input image signal based on the motion vector information between frames or fields of the input image signal, and
when the degree of the deterioration of the input image signal determined by the determining portion is equal to or higher than a predetermined value, the interpolation of the image signal generated by applying the motion compensation processing is not executed, wherein
when the degree of the deterioration of the input image signal determined by the determining portion is equal to or higher than a predetermined value, the rate converting portion interpolates the image signal generated by making the motion compensation processing in the interpolation image generating portion ineffective between the frames or fields of the input image signal.

2. The image displaying device as defined in claim 1, wherein
the interpolation image generating portion comprises;
a motion vector detecting portion that detects the motion vector information between consecutive frames or fields included in the input image signal; and
an interpolating vector allocating portion that allocates an interpolating vector between the frames or the fields based on the detected motion vector information.

3. The image displaying device as defined in claim 2, wherein
when the degree of the deterioration of the input image signal determined by the determining portion is equal to or higher than a predetermined value, the interpolation image generating portion makes the motion compensation processing ineffective by setting the motion vector detected by the motion vector detecting portion to zero-vector.

4. The image displaying device as defined in claim 2, wherein
when the degree of the deterioration of the input image signal determined by the determining portion is equal to or higher than a predetermined value, the interpolation image generating portion makes the motion compensation processing ineffective by setting the interpolating vector allocated by the interpolating vector allocating portion to zero-vector.

5. An image displaying device having a rate converting portion that interpolates an interpolation image signal between frames or fields of an input image signal to convert the number of frames or fields of the input image signal, further comprising
a determining portion that determines the degree of deterioration of the input image signal, wherein
the rate converting portion comprises an interpolation image generating portion that generates the interpolation image signal by applying a motion compensation processing to the input image signal based on the motion vector information between frames or fields of the input image signal, and
when the degree of the deterioration of the input image signal determined by the determining portion is equal to or higher than a predetermined value, the interpolation of the image signal generated by applying the motion compensation processing is not executed, wherein
when the degree of the deterioration of the input image signal determined by the determining portion is equal to or higher than a predetermined value, the interpolation image signal generated by giving the motion compensation processing is not inserted between the frames or the fields of the input image signal and the number of frames or fields of the input image signal is not converted.

6. The image displaying device as defined in claim 5, wherein
a driving frequency of a display panel that displays an image signal is variable, and
a portion for changing the driving frequency of the display panel from a frame frequency or a field frequency converted by the rate converting portion to a frame frequency or a field frequency of the input image signal when the degree of the deterioration of the input image signal determined by the determining portion is equal to or higher than a predetermined value is included.

7. An image displaying device having a rate converting portion that interpolates an interpolation image signal between frames or fields of an input image signal to convert the number of frames or fields of the input image signal, further comprising a determining portion that determines the degree of deterioration of the input image signal, wherein the rate converting portion comprises an interpolation image generating portion that generates the interpolation image signal by applying a motion compensation processing to the input image signal based on the motion vector information between frames or fields of the input image signal, and when the degree of the deterioration of the input image signal determined by the determining portion is equal to or higher than a predetermined value, the interpolation of the image signal generated by applying the motion compensation processing is not executed, wherein when the degree of the deterioration of the input image signal determined by the determining portion is equal to or higher than a predetermined value, the rate converting portion converts the number of frames or fields of the input image signal by inserting an image signal to which the motion compensation processing has not been performed between frames or fields of the input image signal.

8. The image displaying device as defined in claim 7, wherein when the degree of the deterioration of the input image signal determined by the determining portion is equal to or higher than a predetermined value, the rate converting portion converts the number of frames or fields of the input image signal by inserting an image signal of the frame or the field between frames or fields of the input image signal.

9. The image displaying device as defined in claim 7, wherein when the degree of the deterioration of the input image signal determined by the determining portion is equal to or higher than a predetermined value, the rate converting portion converts the number of frames or fields of the input image signal by interpolating an image signal obtained by giving a linear interpolation processing to an image signal of the frame or the field between frames or fields of the input image signal.

10. The image displaying device as defined in claim 6, wherein when the degree of the deterioration of the input image signal determined by the determining portion is equal to or higher than a predetermined value, the rate converting portion converts the number of frames or fields of the input image signal by inserting an predetermined monochrome image signal between frames or fields of the input image signal.

11. An image displaying method having a rate converting process that converts the number of frames or fields of an input image signal by interpolating an interpolation image signal between frames or fields of the input image signal, further comprising a process for determining the degree of deterioration of the input image signal, wherein the rate converting process comprises an interpolation image generating process for generating an interpolation image signal by applying motion compensation processing to the input image signal based on the motion vector information between frames or fields of the input image signal, and when the determined degree of the deterioration of the input image signal is equal to or higher than the predetermined value, the interpolation of the image signal generated by applying the motion compensation processing is not executed, wherein when the degree of the deterioration of the input image signal is equal to or higher than the predetermined value, the image signal generated by making the motion compensation processing in the interpolation image generating process ineffective is interpolated between frames or fields of the input image signal.

12. An image displaying method having a rate converting process that converts the number of frames or fields of an input image signal by interpolating an interpolation image signal between frames or fields of the input image signal, further comprising a process for determining the degree of deterioration of the input image signal, wherein the rate converting process comprises an interpolation image generating process for generating an interpolation image signal by applying motion compensation processing to the input image signal based on the motion vector information between frames or fields of the input image signal, and when the determined degree of the deterioration of the input image signal is equal to or higher than the predetermined value, the interpolation of the image signal generated by applying the motion compensation processing is not executed, wherein when the degree of the deterioration of the input image signal is equal to or higher than the predetermined value, the interpolation image signal generated by applying the motion compensation processing is not inserted between frames or fields of the input image signal and the number of frames or fields of the input image signal is not converted.

13. An image displaying method having a rate converting process that converts the number of frames or fields of an input image signal by interpolating an interpolation image signal between frames or fields of the input image signal, further comprising a process for determining the degree of deterioration of the input image signal, wherein the rate converting process comprises an interpolation image generating process for generating an interpolation image signal by applying motion compensation processing to the input image signal based on the motion vector information between frames or fields of the input image signal, and when the determined degree of the deterioration of the input image signal is equal to or higher than the predetermined value, the interpolation of the image signal generated by applying the motion compensation processing is not executed, wherein when the degree of the deterioration of the input image signal is equal to or higher than the predetermined value, the number of frames or fields of the input image signal is converted by inserting an image signal of the frame or the field between frames or fields of the input image signal in the rate converting process.

14. An image displaying method having a rate converting process that converts the number of frames or fields of an input image signal by interpolating an interpolation image signal between frames or fields of the input image signal, further comprising a process for determining the degree of deterioration of the input image signal, wherein the rate converting process comprises an interpolation image generating process for generating an interpolation image signal by applying motion compensation processing to the input image signal based on the motion vector information between frames or fields of the input image signal, and when the determined degree of the deterioration of the input image signal is equal to or higher than the predetermined value, the interpolation of the image signal generated by applying the motion compensation processing is not executed, wherein when the degree of the deterioration of the input image signal is equal to or higher than the predetermined value, the number of frames or fields of the input image signal is converted by interpolating an image signal to which a liner interpolation processing has been performed to an image signal of the frame or the field between frames or fields of the input image signal in the rate converting process.

15. An image displaying method having a rate converting process that converts the number of frames or fields of an input image signal by interpolating an interpolation image signal between frames or fields of the input image signal, further comprising a process for determining the degree of deterioration of the input image signal, wherein the rate converting process comprises an interpolation image generating process for generating an interpolation image signal by applying motion compensation processing to the input image signal based on the motion vector information between frames or fields of the input image signal, and when the determined degree of the deterioration of the input image signal is equal to or higher than the predetermined value, the interpolation of the image signal generated by applying the motion compensation processing is not executed, wherein when the degree of the deterioration of the input image signal is equal to or higher than the predetermined value, the number of frames or fields of the input image signal is converted by inserting a predetermined monochrome image signal between frames or fields of the input image signal in the rate converting process.

16. An image processing device having a rate converting portion that interpolates an interpolation image signal between frames or fields of an input image signal to convert the number of frames or fields of the input image signal, wherein the rate converting portion comprises an interpolation image generating portion that generates the interpolation image signal by applying a motion compensation processing to the input image signal based on the motion vector information between frames or fields of the input image signal, and when the degree of deterioration of the input image signal determined by the determining portion of determining the degree of the deterioration of the input image signal is equal to or higher than a predetermined value, the interpolation of the image signal generated by applying the motion compensation processing is not executed, wherein when the degree of the deterioration of the input image signal determined by the determining portion is equal to or higher than a predetermined value, the rate converting portion interpolates the image signal generated by making the motion compensation processing in the interpolation image generating portion between frames or fields of the input image signal.

17. An image processing device having a rate converting portion that interpolates an interpolation image signal between frames or fields of an input image signal to convert the number of frames or fields of the input image signal, wherein the rate converting portion comprises an interpolation image generating portion that generates the interpolation image signal by applying a motion compensation processing to the input image signal based on the motion vector information between frames or fields of the input image signal, and when the degree of deterioration of the input image signal determined by the determining portion of determining the degree of the deterioration of the input image signal is equal to or higher than a predetermined value, the interpolation of the image signal generated by applying the motion compensation processing is not executed, wherein when a genre determined by the determining portion is the predetermined genre, the rate converting portion converts the number of frames or fields of the input image signal by inserting an image signal to which the motion compensation processing has not been performed between frames or fields of the input image signal.

18. An image processing method having a rate converting process that converts the number of frames or fields of an input image signal by interpolating an interpolation image signal between frames or fields of the input image signal, further comprising a process for determining the degree of deterioration of the input image signal, wherein the rate converting process comprises an interpolation image generating process for generating an interpolation image signal by applying the motion compensation processing to the input image signal based on the motion vector information between frames or fields of the input image signal, and when the determined degree of the deterioration of the input image signal is equal to or higher than the predetermined value, the interpolation of the image signal generated by applying the motion compensation processing is not executed, wherein when the degree of the deterioration of the input image signal is equal to or higher than the predetermined value, an image signal generated by making the motion compensation processing in the interpolation image generating process is interpolated between frames or fields of the input image signal in the rate converting process.

19. An image processing method having a rate converting process that converts the number of frames or fields of an input image signal by interpolating an interpolation image signal between frames or fields of the input image signal, further comprising a process for determining the degree of deterioration of the input image signal, wherein the rate converting process comprises an interpolation image generating process for generating an interpolation image signal by applying the motion compensation processing to the input image signal based on the motion vector information between frames or fields of the input image signal, and when the determined degree of the deterioration of the input image signal is equal to or higher than the predetermined value, the interpolation of the image signal generated by applying the motion compensation processing is not executed, wherein when the degree of the deterioration of the input image signal is equal to or higher than the predetermined value, the number of frames or fields of the input image signal is converted by inserting an image signal of the frame or the field between frames or fields of the input image signal in the rate converting process.

20. An image processing method having a rate converting process that converts the number of frames or fields of an input image signal by interpolating an interpolation image signal between frames or fields of the input image signal, further comprising
   a process for determining the degree of deterioration of the input image signal, wherein
   the rate converting process comprises an interpolation image generating process for generating an interpolation image signal by applying the motion compensation processing to the input image signal based on the motion vector information between frames or fields of the input image signal, and
   when the determined degree of the deterioration of the input image signal is equal to or higher than the predetermined value, the interpolation of the image signal generated by applying the motion compensation processing is not executed, wherein
   when the degree of the deterioration of the input image signal is equal to or higher than the predetermined value, the number of frames or fields of the input image signal is converted by interpolating an image signal generated by applying a linear interpolation processing to the image signal of the frame or the field between frames or fields of the input image signal in the rate converting process.

21. An image processing method having a rate converting process that converts the number of frames or fields of an input image signal by interpolating an interpolation image signal between frames or fields of the input image signal, further comprising
   a process for determining the degree of deterioration of the input image signal, wherein
   the rate converting process comprises an interpolation image generating process for generating an interpolation image signal by applying the motion compensation processing to the input image signal based on the motion vector information between frames or fields of the input image signal, and
   when the determined degree of the deterioration of the input image signal is equal to or higher than the predetermined value, the interpolation of the image signal generated by applying the motion compensation processing is not executed, wherein
   when the degree of the deterioration of the input image signal is equal to or higher than the predetermined value, the number of frames or fields of the input image signal is converted by inserting a predetermined monochrome image signal between frames or fields of the input image signal in the rate converting process.

22. An image displaying device having a rate converting portion that interpolates an interpolation image signal between frames or fields of an input image signal to convert the number of frames or fields of the input image signal, further comprising
   a determining portion for determining the degree of deterioration of the input image signal, wherein
   the rate converting portion comprises an interpolation image generating portion that generates the interpolation image signal by applying motion compensation processing to the input image signal based on the motion vector information between frames or fields of the input image signal, and
   when the degree of the deterioration of the input image signal determined by the determining portion is equal to or higher than a predetermined value, an interpolation image signal generated by reducing the compensation intensity of the motion compensation processing is interpolated between frames or fields of the input image signal, wherein
   the interpolation image generating portion generates the interpolation image signal by making weighted addition of an image signal to which the motion compensation processing has been performed and an image signal to which the motion compensation processing has not been performed at a predetermined ratio, and
   when the degree of the deterioration of the input image signal determined by the determining portion is equal to or higher than the predetermined value, the ratio of the weighted addition is varied.

23. The image displaying device as defined in claim 22, wherein
   when a genre determined by the determining portion is the predetermined genre, the interpolation image generating portion defines an image signal to which the motion compensation processing has not been performed as the interpolation image signal, and
   when the degree of the deterioration of the input image signal determined by the determining portion is equal to or higher than the predetermined value, the interpolation image generating portion defines an image signal to which the motion compensation processing has been performed as the interpolation image signal.

24. The image displaying device as defined in claim 22, wherein
   the interpolation image generating portion uses an image signal to which a linear interpolation processing has been performed between frames or fields of the input image signal as the image signal to which the motion compensation processing has not been performed.

* * * * *